US008384958B2

(12) United States Patent
Kondoh

(10) Patent No.: US 8,384,958 B2
(45) Date of Patent: *Feb. 26, 2013

(54) IMAGE FORMING APPARATUS, DENSITY-SHIFT CORRECTION METHOD, AND COMPUTER PROGRAM PRODUCT

(75) Inventor: Tomohide Kondoh, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 766 days.

This patent is subject to a terminal disclaimer.

(21) Appl. No.: 12/585,134

(22) Filed: Sep. 4, 2009

(65) Prior Publication Data

US 2010/0060938 A1    Mar. 11, 2010

(30) Foreign Application Priority Data

Sep. 8, 2008 (JP) ................................. 2008-229446

(51) Int. Cl.
*H04N 1/405* (2006.01)
*G06T 5/00* (2006.01)
*G06K 9/40* (2006.01)

(52) U.S. Cl. .................. 358/3.13; 358/3.26; 382/275

(58) Field of Classification Search .............. 358/3.13, 358/1.9, 3.26, 1.14, 461, 2.1, 3.24; 347/116, 347/233; 348/240.2, 479; 382/274, 275, 382/218; 250/226, 208.1, 332, E31.12
See application file for complete search history.

(56) References Cited

U.S. PATENT DOCUMENTS

| | | | | |
|---|---|---|---|---|
| 6,271,869 B1* | 8/2001 | Tada et al. | ..................... | 347/116 |
| 7,456,384 B2* | 11/2008 | Toda | ............................. | 250/226 |
| 7,777,918 B2* | 8/2010 | Sekizawa et al. | ............ | 358/3.26 |
| 8,159,564 B2* | 4/2012 | Matsumoto et al. | ....... | 348/240.2 |
| 8,159,722 B2* | 4/2012 | Higashiyama et al. | ...... | 358/3.26 |
| 2008/0174799 A1 | 7/2008 | Higashiyama et al. | | |
| 2009/0231606 A1* | 9/2009 | Kawai et al. | .................. | 358/1.9 |

FOREIGN PATENT DOCUMENTS

JP         3715349        9/2005
JP      2009-63662        3/2009

OTHER PUBLICATIONS

Abstract of JP-9-039294 published Feb. 10, 1997.

* cited by examiner

*Primary Examiner* — Charlotte M Baker
(74) *Attorney, Agent, or Firm* — Harness, Dickey & Pierce, PLC

(57) ABSTRACT

A density detector detects a first density of a first pattern and a second density of a second pattern from a density-correction determination patch. A density-correction-value calculator calculates a density correction value from the first and the second densities. A noise-occurrence determination unit determines whether a target pixel is a noise generating pixel that causes a change of a local density due to a change in a relation with a nearby pixel. A density correction processor performs a density correction process on the target pixel by adding or subtracting the density correction value to or from the target pixel or the nearby pixel.

12 Claims, 27 Drawing Sheets

FIG. 9A
| REFERENCE COLOR | K |
|---|---|
| K-SKEW AMOUNT [μm] | 0 |
| M-SKEW AMOUNT [μm] | −110 |
| C-SKEW AMOUNT [μm] | −130 |
| Y-SKEW AMOUNT [μm] | 30 |
FIG. 9B
| REFERENCE COLOR | K |
|---|---|
| K-SKEW AMOUNT [LINE] | 0 |
| M-SKEW AMOUNT [LINE] | +3 |
| C-SKEW AMOUNT [LINE] | +3 |
| Y-SKEW AMOUNT [LINE] | −1 |
FIG. 10A
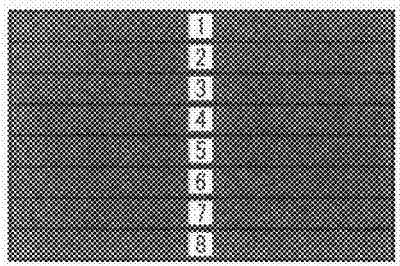
FIG. 10B
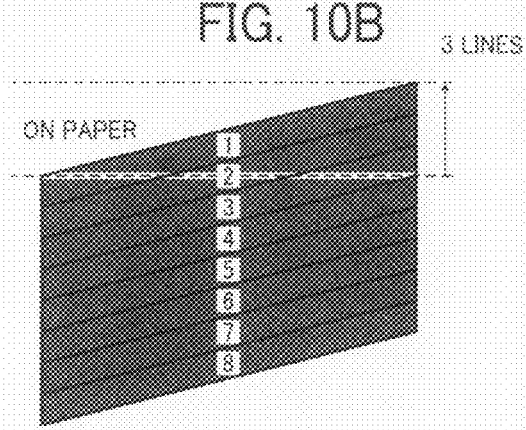
FIG. 10C
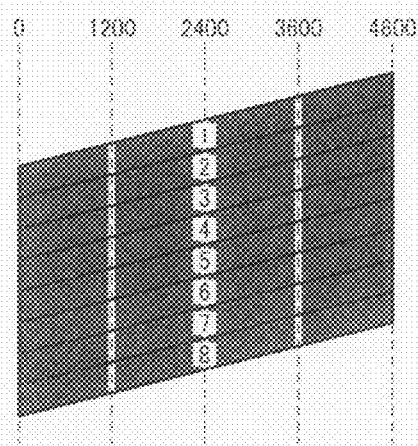
FIG. 10D
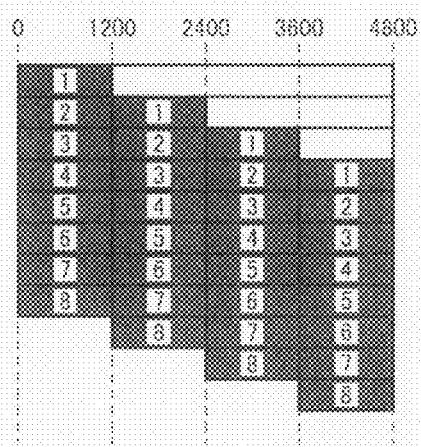

FIG. 10E
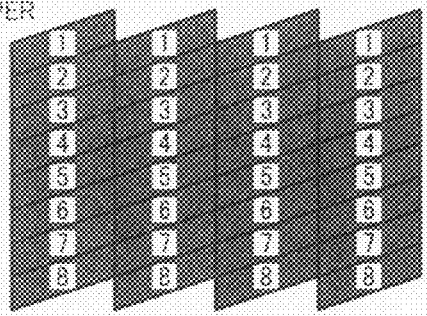
ON PAPER
FIG. 10F
DATA FOR SKEW CORRECTION
|  | 1 | 2 | 3 | 4 |
|---|---|---|---|---|
| DIVIDED POSITION | 1200 | 2400 | 3600 |  |
| SHIFT DIRECTION | − | − | − |  |
FIG. 11A
INPUT IMAGE DIAGRAM
FIG. 11B
ON PAPER
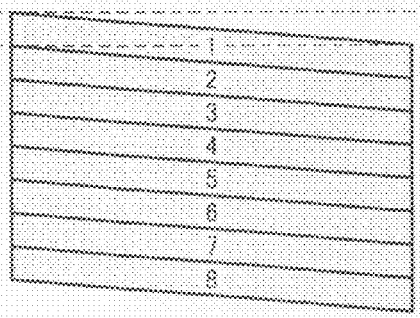

FIG. 11C
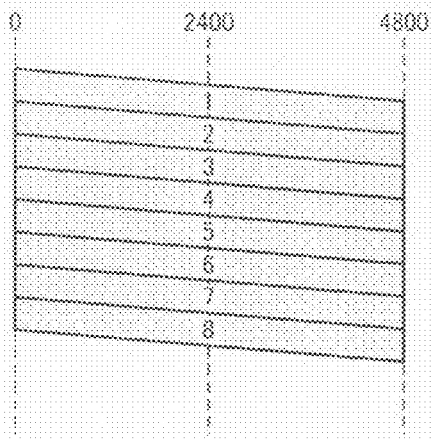
FIG. 11D
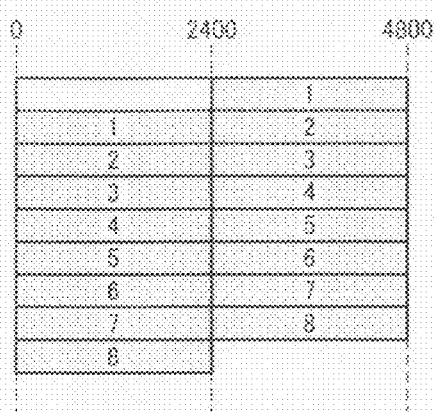
FIG. 11E
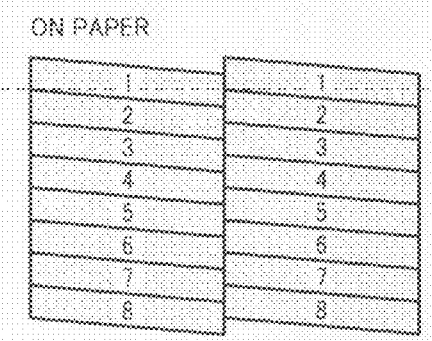
FIG. 11F
DATA FOR SKEW CORRECTION
|  | 1 | 2 | 3 | 4 |
|---|---|---|---|---|
| DIVIDED POSITION | 1200 |  |  |  |
| SHIFT DIRECTION | + |  |  |  |

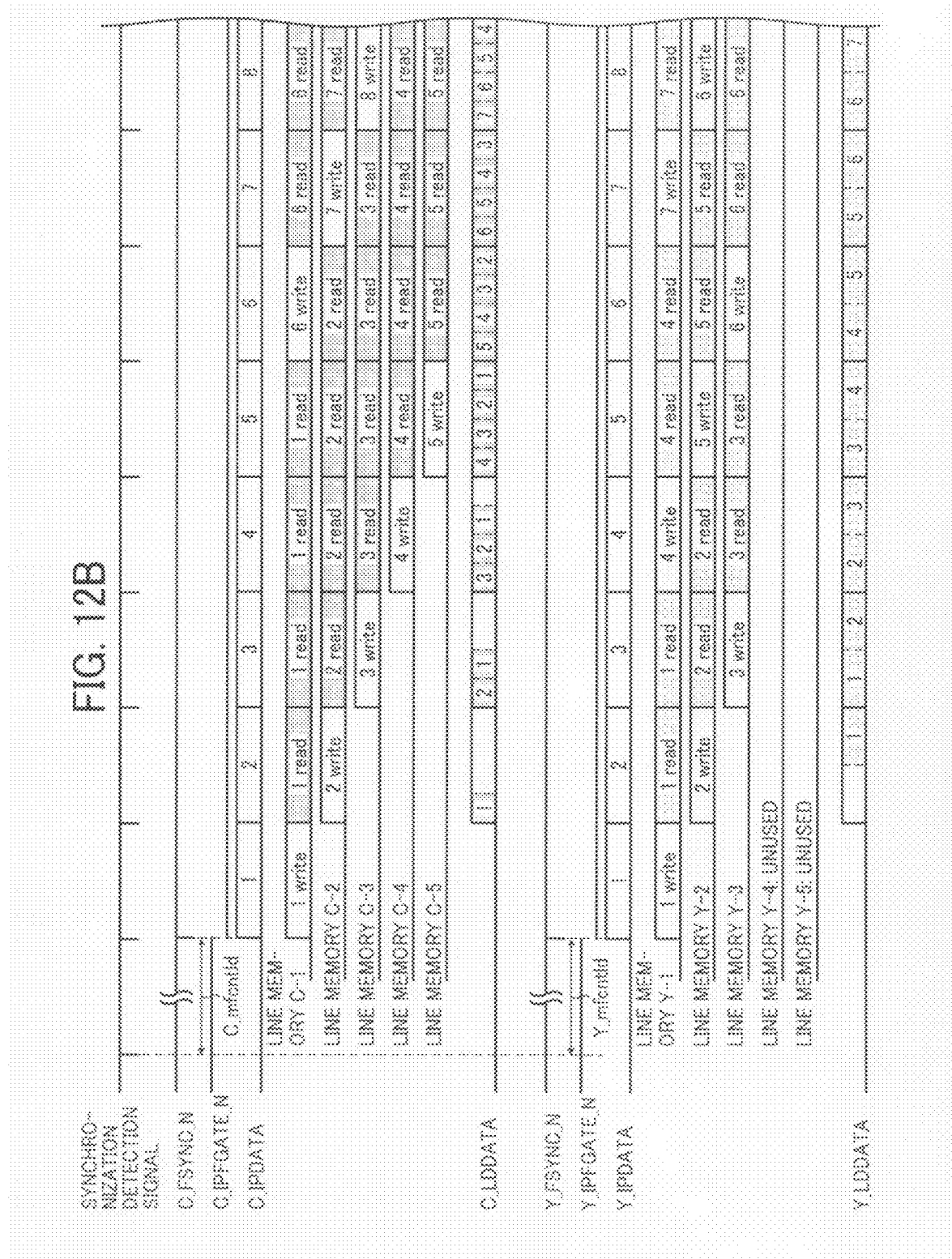

IMAGE FORMING APPARATUS, DENSITY-SHIFT CORRECTION METHOD, AND COMPUTER PROGRAM PRODUCT

CROSS-REFERENCE TO RELATED APPLICATIONS

The present application claims priority to and incorporates by reference the entire contents of Japanese Patent Application No. 2008-229446 filed in Japan on Sep. 8, 2008.

BACKGROUND OF THE INVENTION

1. Field of the Invention

The present invention relates to an image forming apparatus, a density-shift correction method, and a computer program product.

2. Description of the Related Art

Higher speed operation is increasingly required of color copiers, and thus a mainstream of the color copiers is tandem-type color copiers in which electrostatic-latent-image forming units each including a photosensitive element are arranged in parallel to each other. The electrostatic-latent-image forming units are provided with four colors of cyan (C), magenta (M), yellow (Y), and black (K). An important task of the tandem type is a technology for registration between the colors in terms of its configuration.

Therefore, many of the tandem-type color copiers have a function of reducing color shift by forming a predetermined toner pattern with toner of each color on a transfer belt and detecting the toner pattern by using an optical sensor to calculate each amount of color shifts between relevant colors factor by factor and by performing feedback-correction on each color shift so as to eliminate each of the color shifts. The factor includes registration shifts, magnification shifts, and skew deviations in a main-scanning direction and a sub-scanning direction.

By implementing the correction process when the power is turned on, when environment such as temperature changes, or when printing is performed more than a predetermined number of copies, control is provided so that each amount of the color shifts is always in a predetermined range or less. Among the amounts of the color shifts, the registration shifts in the main and the sub-scanning directions can be corrected by controlling a timing of laser-beam writing in a photosensitive element, and the main-scanning magnification shift can be electrically corrected by controlling pixel clocks.

As for skew of the laser beam used for scan and exposure, there are two methods: a method of mechanically correcting the skew and a method of correcting an output image through an image process. In the method of mechanically correcting the skew, a control mechanism that displaces a mirror inside a laser-beam writing unit is provided to implement the correction. However, an actuator such as a mirror displacement motor is required to automatically implement the correction, which causes an increase in cost and prevents reduction of the size of the laser-beam writing unit.

Meanwhile, in the method of correcting the output image through the image process, part of an image is stored in a line memory and the image is read from the line memory while switching a read position from one to another so as to shift the output image in an opposite direction to the skew and output the image, so that the skew between the colors is corrected. This case has an advantage of achieving the correction with comparatively low cost as compared with the mechanical correction because the line memory is simply added to an image processing unit according to a correction range.

Japanese Patent No. 3715349 discloses an image recording device that reduces the skew through the image process. The image recording device can reduce stripe-like noises by detecting whether a target pixel is at a shift position and by providing density correction to the target pixel when a change point of an adjacent pixel in the main-scanning direction and a pixel pattern around the target pixel match a predetermined pattern at the shift position. More specifically, the density correction corresponds to a set of the pixel pattern and the change point of the adjacent pixel in the main-scanning direction matching the predetermined pattern.

However, in the technology described in Japanese Patent No. 3715349, a fixed density correction value is always only added or subtracted to or from the target pixel or the pixel in which noise (density shift) occurs. In other words, the density correction is not always provided to the pixel so as to cancel out density variation. Therefore, the stripe-like noises cannot sometimes be appropriately corrected.

SUMMARY OF THE INVENTION

It is an object of the present invention to at least partially solve the problems in the conventional technology.

According to one aspect of the present invention, there is provided an image forming apparatus that divides pixels expressing one line of image in a main-scanning direction, outputs divided pixels by shifting the pixels in a sub-scanning direction opposite to a skew to thereby correct the skew, and performs a density correction process on a target pixel adjacent to a shift position or a nearby pixel of the target pixel to correct a density variation due to a shift of the pixel upon correction of the skew. The image forming apparatus includes a density detector that detects a first density of a first pattern formed by repeating a specific pixel array and a second density of a second pattern in which a repetition of the specific pixel array is shifted by one pixel with a boundary from a density-correction determination patch that is composed of the first pattern and the second pattern and transferred to a transfer belt; a density-correction-value calculator that calculates a density correction value from the first density and the second density; a noise-occurrence determination unit that determines whether the target pixel is a noise generating pixel that causes a change of a local density due to a change in an adjacency relationship between the target pixel and the nearby pixel; and a density correction processor that performs the density correction process on the target pixel, when the target pixel is determined as the noise generating pixel, by adding or subtracting the density correction value to or from the target pixel or the nearby pixel.

Furthermore, according to another aspect of the present invention, there is provided a method of correcting a density shift in an image forming apparatus that divides pixels expressing one line of image in a main-scanning direction, outputs divided pixels by shifting the pixels in a sub-scanning direction opposite to a skew to thereby correct the skew, and performs a density correction process on a target pixel adjacent to a shift position or a nearby pixel of the target pixel to correct a density variation due to a shift of the pixel upon correction of the skew. The method includes detecting a first density of a first pattern formed by repeating a specific pixel array and a second density of a second pattern in which a repetition of the specific pixel array is shifted by one pixel with a boundary from a density-correction determination patch that is composed of the first pattern and the second pattern and transferred to a transfer belt; calculating a density correction value from the first density and the second density; determining whether the target pixel is a noise generating pixel that causes a change of a local density due to a change in an adjacency relationship between the target pixel and the nearby pixel; and performing the density correction process on the target pixel, when the target pixel is determined as the noise generating pixel, by adding or subtracting the density correction value to or from the target pixel or the nearby pixel.

Moreover, according to still another aspect of the present invention, there is provided a computer program product including a computer-usable medium having computer-readable program codes embodied in the medium for correcting a density shift in an image forming apparatus that divides pixels expressing one line of image in a main-scanning direction, outputs divided pixels by shifting the pixels in a sub-scanning direction opposite to a skew to thereby correct the skew, and performs a density correction process on a target pixel adjacent to a shift position or a nearby pixel of the target pixel to correct a density variation due to a shift of the pixel upon correction of the skew. The program codes when executed cause a computer to execute detecting a first density of a first pattern formed by repeating a specific pixel array and a second density of a second pattern in which a repetition of the specific pixel array is shifted by one pixel with a boundary from a density-correction determination patch that is composed of the first pattern and the second pattern and transferred to a transfer belt; calculating a density correction value from the first density and the second density; determining whether the target pixel is a noise generating pixel that causes a change of a local density due to a change in an adjacency relationship between the target pixel and the nearby pixel; and performing the density correction process on the target pixel, when the target pixel is determined as the noise generating pixel, by adding or subtracting the density correction value to or from the target pixel or the nearby pixel.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9A is a diagram of an example of skew amounts of colors based on a K color as a reference when a resolution in the sub-scanning direction is 600 dpi;

FIG. 9B is a diagram of an example of skew correction amounts in the case of FIG. 9A;

FIG. 10A is a diagram of an example for explaining a skew correction method (method of calculating a skew correction amount);

FIG. 10B is a diagram of an example for explaining the skew correction method (method of calculating the skew correction amount);

FIG. 10C is a diagram of an example for explaining the skew correction method (method of calculating the skew correction amount);

FIG. 10D is a diagram of an example for explaining the skew correction method (method of calculating the skew correction amount);

FIG. 10E is a diagram of an example for explaining the skew correction method (method of calculating the skew correction amount);

FIG. 10F is a diagram of an example for explaining the skew correction method (method of calculating the skew correction amount);

FIG. 11A is a diagram of another example for explaining the skew correction method (method of calculating the skew correction amount);

FIG. 11B is a diagram of another example for explaining the skew correction method (method of calculating the skew correction amount);

FIG. 11C is a diagram of another example for explaining the skew correction method (method of calculating the skew correction amount);

FIG. 11D is a diagram of another example for explaining the skew correction method (method of calculating the skew correction amount);

FIG. 11E is a diagram of another example for explaining the skew correction method (method of calculating the skew correction amount);

FIG. 11F is a diagram of another example for explaining the skew correction method (method of calculating the skew correction amount);

FIG. 12B is a timing chart of line memories when a skew is corrected;

DETAILED DESCRIPTION OF THE PREFERRED EMBODIMENTS

Exemplary embodiments of an image forming apparatus, a density-shift correction method, and a computer program according to the present invention are explained in detail below with reference to the accompanying drawings. The following embodiments show an example of applying the image forming apparatus according to the present invention to a color copier. However, the present invention is not limited to the color copier, and is therefore applicable to those that perform an image process, such as a facsimile and a multi-function product that includes a plurality of functions such as a scanner, a copier, a facsimile, and a printer in one housing. In the followings, a configuration and a correction process of the color copier applied with the present invention are explained first, and then, the embodiments of the present invention will be explained.

Figure 1:
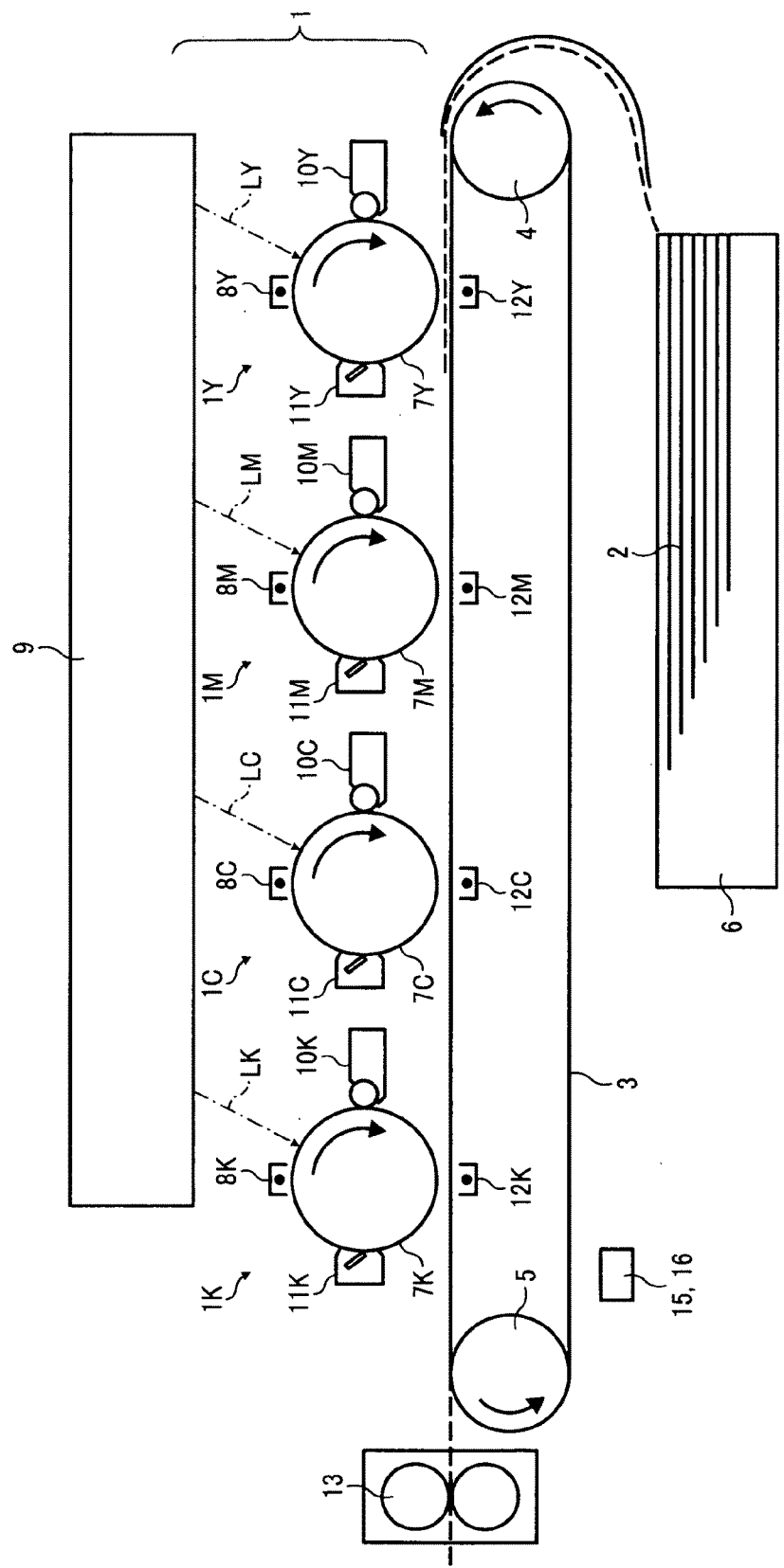
FIG. 1 is a front view of an image processing unit, an exposure unit, and a transfer belt to explain an imaging principle of a color copier.

First, an imaging principle of the color copier is explained below with reference to FIG. 1. FIG. 1 is a front view of an image processing unit, an exposure unit, and a transfer belt to explain the imaging principle of the color copier. The color copier forms an image on a transfer paper through electro-photographic image formation.

The color copier is a tandem type color copier in which four imaging units 1Y, 1M, 1C, and 1K that are provided inside an image processor 1 and form images of different colors of yellow, magenta, cyan, and black (Y, M, C, and K) are arranged in line along a transfer belt 3 for conveying a transfer paper 2 as a transfer medium. The transfer belt 3 is stretched between a drive roller 4 that rotatably drives the transfer belt 3 and a driven roller 5 that follows the rotation, and the rotation of the drive roller 4 causes the transfer belt 3 to be rotated in an arrow direction in FIG. 1. Provided below the transfer belt 3 is a paper feed tray 6 with the transfer papers 2 stored therein. An uppermost one of the transfer papers 2 is fed toward the transfer belt 3 upon image formation, and is attracted to the transfer belt 3 through electrostatic attraction. The attracted transfer paper 2 is conveyed to the imaging unit 1Y, where an image of the Y color is initially formed.

The imaging units 1Y, 1M, 1C, and 1K include photosensitive drums 7Y, 7M, 7C, and 7K; chargers 8Y, 8M, 8C, and 8K around the photosensitive drums 7Y, 7M, 7C, and 7K, respectively; developing units 10Y, 10M, 10C, and 10K; photosensitive-element cleaners 11Y, 1M, 11C, and 11K; and transfer units 12Y, 12M, 12C, and 12K, respectively.

The surface of the photosensitive drum 7Y in the imaging unit 1Y is uniformly charged by the charger 8Y, and is exposed with a laser beam LY corresponding to the Y-color image by an exposure unit 9, to form an electrostatic latent image on the surface thereof. The formed electrostatic latent image is developed by the developing unit 10Y and a toner image is formed on the photosensitive drum 7Y. The toner image is transferred to the transfer paper 2 by the transfer unit 12Y at a position (transfer position) where the photosensitive drum 7Y and the transfer paper 2 on the transfer belt 3 are brought into contact with each other, and the image of a single color (Y color) is thereby formed on the transfer paper 2. After the image is transferred from the photosensitive drum 7Y to the transfer paper 2, unnecessary toner remaining on the drum surface is cleaned by the photosensitive-element cleaner 11Y, and the photosensitive drum 7Y is in standby for next image formation.

As explained above, the transfer paper 2 with the single color (Y color) transferred thereto by the imaging unit 1Y is conveyed to the imaging unit 1M by the transfer belt 3. Similarly to the above case, an M-color toner image formed on the photosensitive drum 7M is superposedly transferred to the transfer paper 2. Thereafter, the transfer paper 2 is further conveyed to the imaging unit 1C and the imaging unit 1K, where C-color and K-color toner images formed on the photosensitive drums 7C and 7K respectively are sequentially transferred to the transfer paper 2, so that a color image is formed on the transfer paper 2.

The transfer paper 2 formed with the color image thereon after passing through the imaging unit 1K is separated from the transfer belt 3, is conveyed to a fixing unit 13, where the color image is fixed on the transfer paper 2, and is ejected.

Registration between the colors is important for the tandem-type color copier in terms of its configuration. A color shift between the colors includes a registration shift in the main-scanning direction (direction in parallel to the rotating shafts of the photosensitive drums 7Y, 7M, 7C, and 7K), a registration shift in the sub-scanning direction (direction perpendicular to the rotating shafts of the photosensitive drums 7Y, 7M, 7C, and 7K), a main-scanning magnification shift, and a skew deviation. Therefore, in this color copier, misregistration between the colors is corrected by using a correction pattern before an actual color imaging operation is performed on the transfer paper 2.

Figure 2:
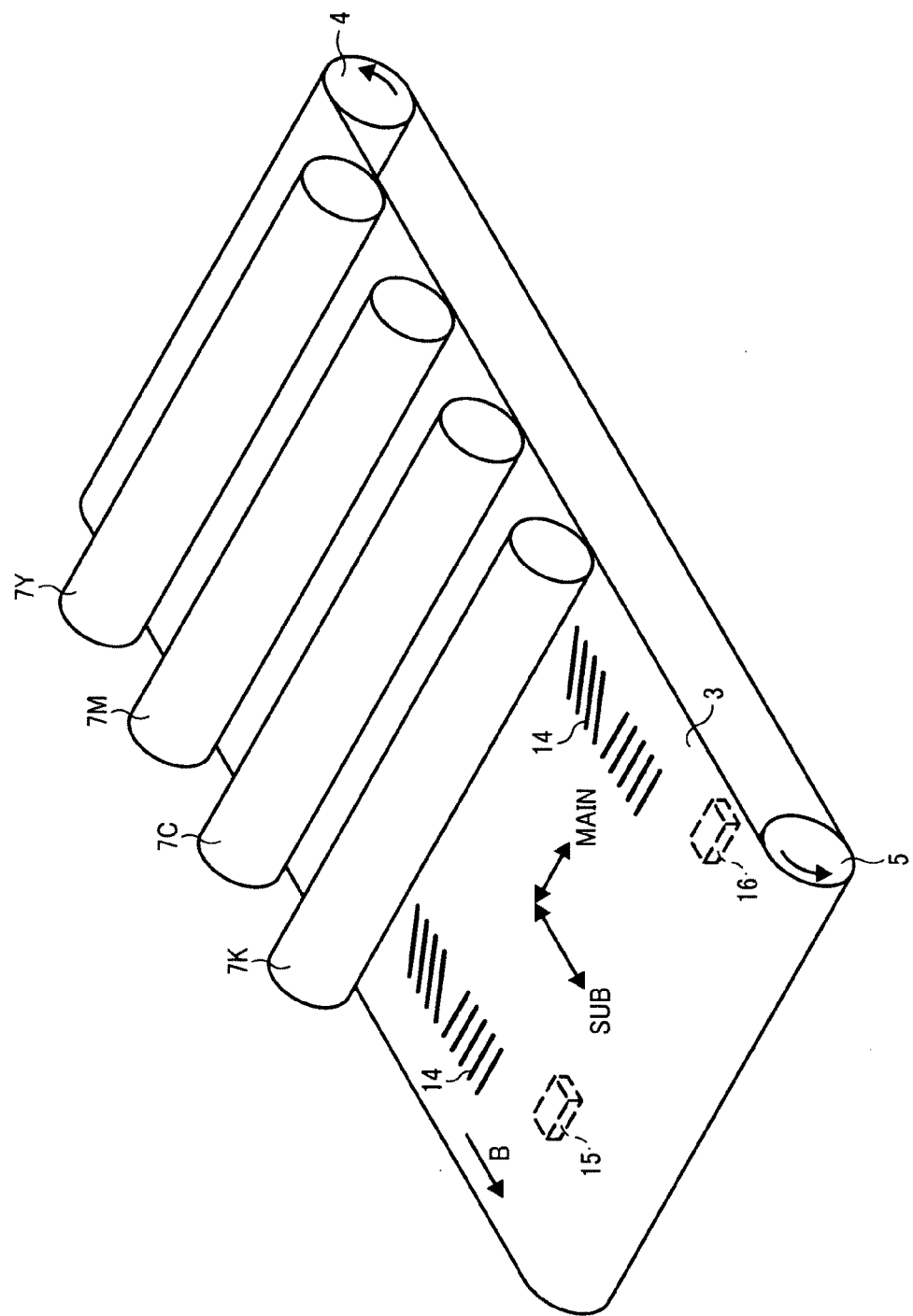
FIG. 2 is a perspective view of the transfer belt with correction patterns formed thereon.

FIG. 2 is a perspective view of the transfer belt with correction patterns formed thereon. In the color copier, to correct misregistration, correction patterns 14 for color shift correction of the colors are formed on the transfer belt 3 by the imaging units 1Y, 1M, 1C, and 1K, and the correction patterns 14 are detected by a plurality of detection sensors 15 and 16.

In the example of FIG. 2, the detection sensors 15 and 16 are arranged at both ends of the transfer belt 3 in the main-scanning direction, and the correction patterns 14 are formed on the transfer belt 3 at positions corresponding to the positions where the detection sensors 15 and 16 are arranged. The correction patterns 14 are detected by causing the transfer belt 3 to move in a conveying direction indicated by an arrow B as shown in FIG. 2 and passing through the detection sensors 15 and 16 respectively. When the detection sensors 15 and 16 detect the correction patterns 14, an operation process is performed, from the results of the detections, to calculate various shift amounts (a main-scanning magnification shift amount, a main-scanning registration shift amount, a sub-scanning registration shift amount, a skew deviation, and a distortion amount), and correction amounts of shift components are calculated from the color shift amounts.

Figure 3:
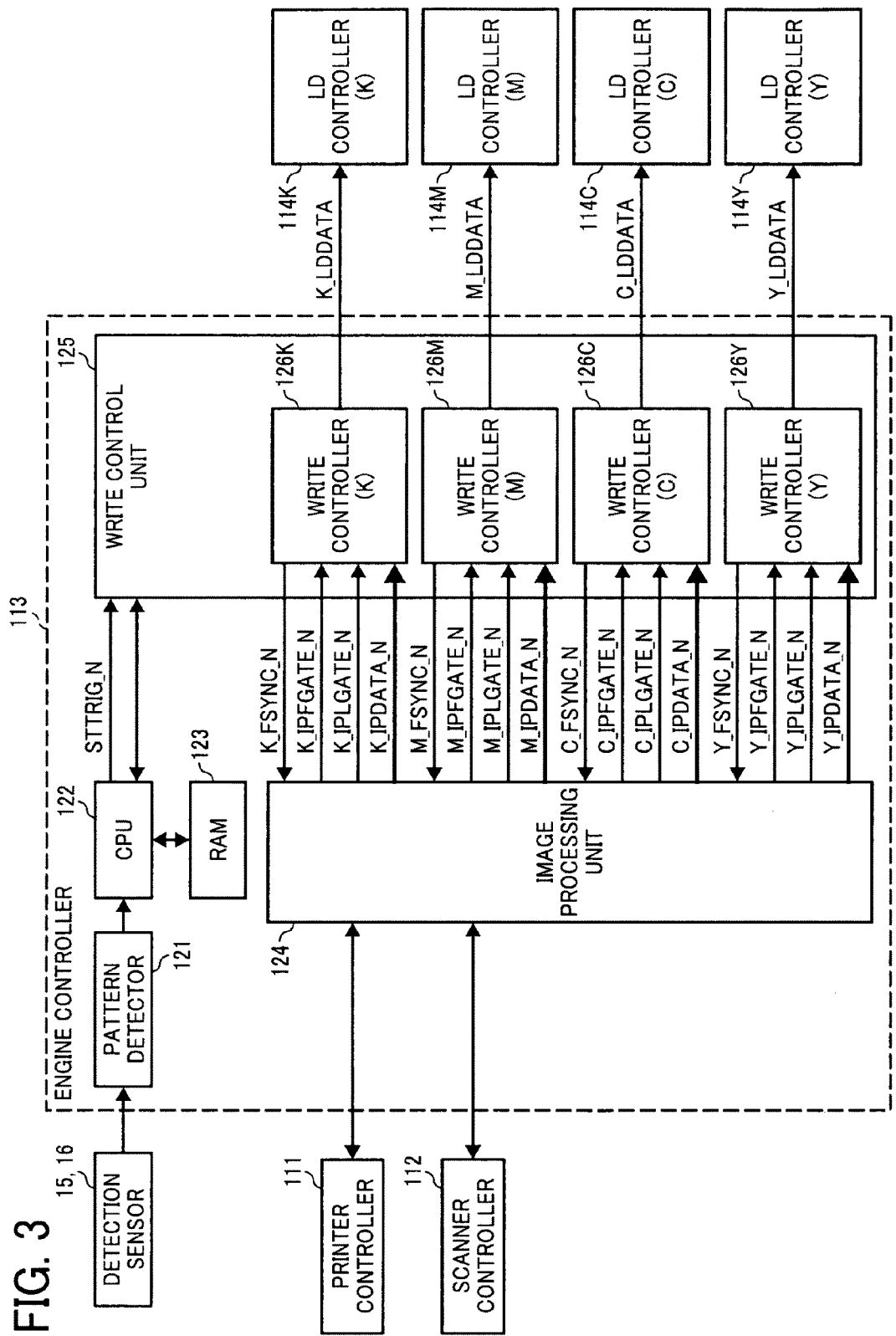
FIG. 3 is a block diagram of an example of a mechanism for performing writing control and correction of misregistration in the color copier.

Next, blocks related to a control operation of the color copier and operations of the blocks are explained below. FIG. 3 is a block diagram of an example of a mechanism for performing writing control and correction of misregistration in the color copier. A processing unit that performs a misregistration correction process in the color copier includes the detection sensors 15 and 16, a printer controller 111, a scanner controller 112, an engine controller 113, and K-, M-, C-, and Y-color laser diode (LD) controllers 114K, 114M, 114C, and 114Y.

The detection sensors 15 and 16 detect the correction patterns 14 on the transfer belt 3 in order to calculate each misregistration between images of the colors. The detection sensors 15 and 16 detect the positions of the correction patterns 14 and output analog detection signals to the engine controller 113.

The detection sensors 15 and 16 also detect densities of density-correction determination patches on the transfer belt 3 in order to calculate density correction values used for a density-shift correction process. The detection sensors 15 and 16 detect the densities of the density-correction determination patches and output the analog detection signals to the engine controller 113. The density-correction determination patch will be explained in detail later.

The printer controller 111 is used to receive image data sent from an external device (e.g., personal computer (hereinafter, "PC")) through a network. The printer controller 111 transfers the received image data to an image processing unit 124.

The scanner controller 112 is used to acquire an image of an original scanned by a scanner (not shown). The scanner controller 112 transfers the acquired image data to the image processing unit 124.

The engine controller 113 includes a pattern detector 121, a central processing unit (CPU) 122, a random access memory (RAM) 123, the image processing unit 124, and a write control unit 125.

The pattern detector 121 amplifies the detection signals (position detected signals) output from the detection sensors 15 and 16, converts the amplified analog detection signals to digital data, and stores the converted digital data in the RAM 123.

The pattern detector 121 also amplifies the detection signals (density detected signals) output from the detection sensors 15 and 16, converts the amplified analog detection signals to digital data, and stores the converted digital data in the RAM 123.

The CPU 122 calculates a color shift amount from the digital data being the detection signals indicating positions of the correction patterns 14 stored in the RAM 123, and calculates a color-shift correction amount used to correct color shift from the calculated color shift amount. The color shift amount includes distortion amounts of the colors, a magnification error amount in the main-scanning direction, a registration shift amount in the main-scanning and a registration shift amount in the sub-scanning direction (hereinafter, "main/sub-scanning registration shift amount"), and a skew deviation. Furthermore, the color-shift correction amount includes distortion correction amounts of the colors, a magnification correction amount in the main-scanning direction, a registration correction amount in the main-scanning and a registration correction amount in the sub-scanning direction (hereinafter, "main/sub-scanning registration correction amount"), and a skew correction amount, which are obtained from the various shift amounts.

The CPU 122 calculates amounts of distorted lines of the Y color, the M color, and the C color when the K color is set as a reference color based on the resolution of the image data and the calculated distortion amounts of the colors (Y, M, C, K), and determines each number of lines in the line memories based on each amount of distorted lines for the colors with respect to the reference color. It should be noted that the reference color indicates a color at a reference position when each distortion amount of the colors is calculated, and the K color is set as the reference color in this example.

Furthermore, the CPU 122 calculates a density correction value X from the digital data which is a detection signal of the density of the density-correction determination patch stored in the RAM 123, and stores the calculated density correction value X in the RAM 123. A method of calculating the density correction value X by the CPU 122 will be explained in detail later.

The RAM 123 temporarily stores therein the digital data for the correction patterns 14 acquired from the pattern detector 121 through the CPU 122, the density data for the density-correction determination patch acquired from the pattern detector 121 through the CPU 122, and the density correction value X calculated from the density data. The RAM 123 may be replaced with a nonvolatile memory, and the nonvolatile memory may store therein the digital data for the correction patterns 14, the density data for the density-correction determination patch, and the density correction value X calculated from the density data.

The image processing unit 124 subjects the image data received by the printer controller 111 or the image data acquired from the scanner controller 112 to various image processes according thereto. The image processing unit 124 receives sub-scanning timing signals (K, M, C, Y)_FSYNC_N for the colors transmitted from the write control unit 125, and transmits main-scanning gate signals (K, M, C, Y)_IPLGATE_N, sub-scanning gate signals (K, M, C, Y)_IPFGATE_N, and image signals (K, M, C, Y)_IPDATA_N associated with these synchronization signals to the write control unit 125.

The write control unit 125 receives the image data transferred from the image processing unit 124, subjects the received image data to various write processes, to generate image signals (K, M, C, Y)_LDDATA, and transmits the generated image signals to the LD controllers 114K, 114M, 114C, and 114Y, respectively.

The LD controllers 114K, 114M, 114C, and 114Y are provided in the exposure unit 9, and control the exposure unit 9 to irradiate laser beams LY, LM, LC, and LK to the photosensitive drums 7Y, 7M, 7C, and 7K, respectively. By irradiating the laser beams LY, LM, LC, and LK, toner images are formed on the photosensitive drums 7Y, 7M, 7C, and 7K, respectively. The formed toner images are transferred to the transfer paper 2 and output.

An outline of the color image forming process in the color copier is explained below. A printer image sent from the PC is processed by the printer controller 111, a copy image is processed by the scanner controller 112, and each of the images is transferred to the image processing unit 124 of the engine controller 113. The image processing unit 124 performs various image processes on the image data according to the image data, converts the processed image data to image data for each color, and transfers the converted image data to the write control unit 125. The write control unit 125 generates printing timing of each color, receives image data in synchronization with sub-scanning timing, subjects the received image data to various write-image processes, and converts the processed image data to LD emission data. The LD controllers 114K, 114M, 114C, and 114Y cause the LDs to emit beams, and form images on the photosensitive drums, respectively.

Figure 4:
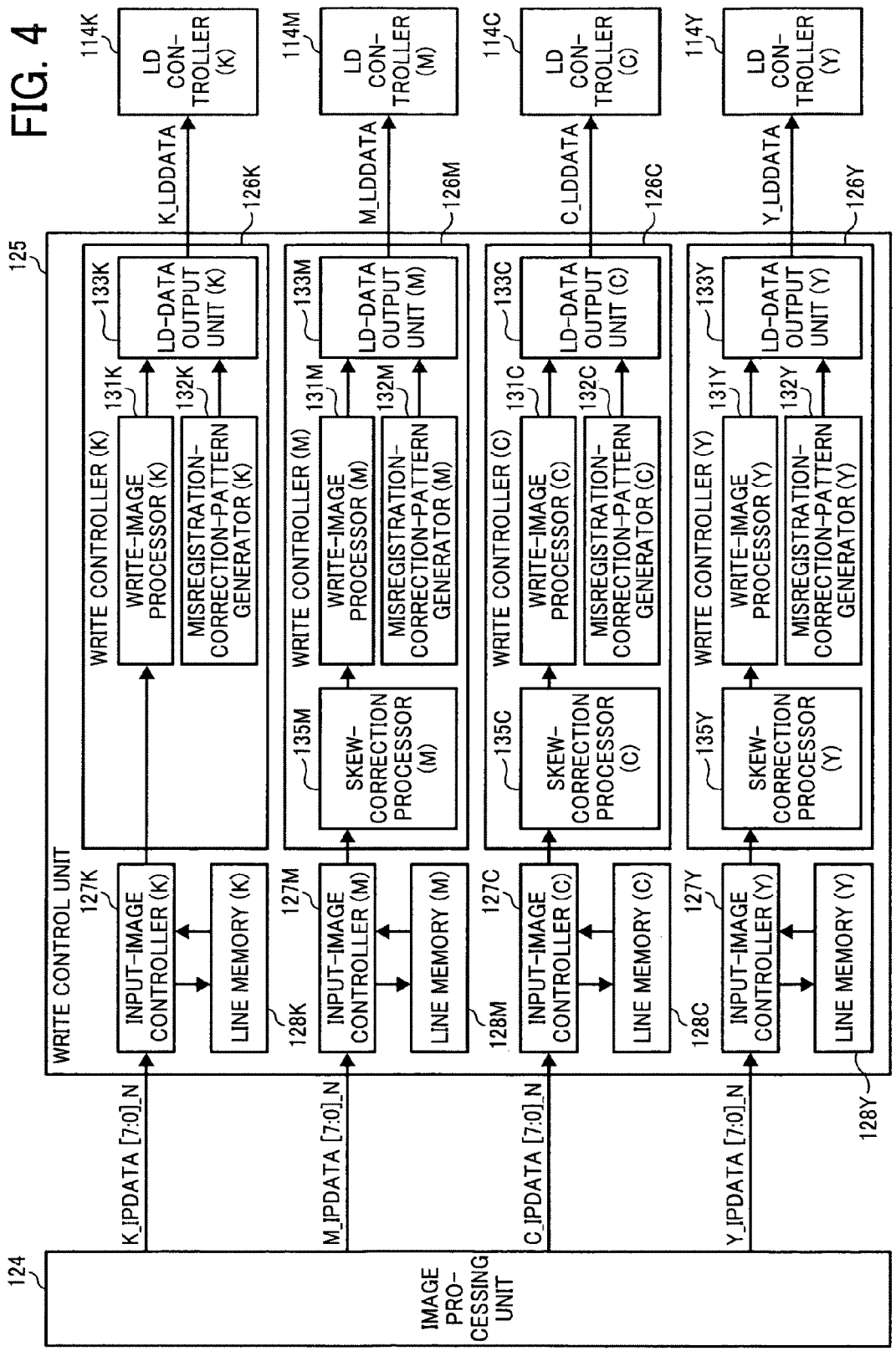
FIG. 4 is a block diagram of an example of a configuration of a write control unit.

The write control unit 125 in the engine controller 113 is further explained with reference to FIG. 4. FIG. 4 is a block diagram of an example of a configuration of the write control unit 125. The write control unit 125 includes write controllers 126K, 126M, 126C, and 126Y; input-image controllers 127K, 127M, 127C, and 127Y; and line memories 128K, 128M, 128C, and 128Y for the K, M, C, and Y colors.

Further, the write controller 126K for the K color as the reference color includes a write-image processor 131K, a misregistration-correction-pattern generator 132K, and an LD-data output unit 133K. The other M-, C-, and Y-color write controllers 126M, 126C, and 126Y include write-image processors 131M, 131C, and 131Y; misregistration-correction-pattern generators 132M, 132C, and 132Y; and LD-data output units 133M, 133C, and 133Y, which have the same configuration as that for the K color, and further include skew-correction processors 135M, 135C, and 135Y, respectively.

In FIG. 4, in order to simplify explanation, the three signals such as the main-scanning gate signals (K, M, C, Y)_IPL-GATE_N, the sub-scanning gate signals (K, M, C, Y)_IPF-GATE_N, and the image signals (K, M, C, Y)_IPDATA_N associated with these synchronization signals explained with reference to FIG. 3 are combined into ones respectively, which are described write control signals (K, M, C, Y)_IP-DATA[7:0]_N.

The write-image processors 131K, 131M, 131C, and 131Y perform various image processes by using image data stored in the line memories 128K, 128M, 128C, and 128Y, respectively.

To calculate correlation values used to correct color shifts of the colors on the transfer belt 3, the misregistration-correction-pattern generators 132K, 132M, 132C, and 132Y generate image data for the correction patterns 14 to be transferred to the transfer belt 3.

The LD-data output units 133K, 133M, 133C, and 133Y send correction write instructions (LDDATA) to the LD controllers 114K, 114M, 114C, and 114Y respectively according to each main/sub-scanning registration correction amount calculated by the CPU 122, so that the LD controllers 114K, 114M, 114C, and 114Y provide respective controls to correct shifts of writing timing due to laser beam irradiations. The LD-data output units 133K, 133M, 133C, and 133Y send image-frequency change instructions (LDDATA) to the LD controllers 114K, 114M, 114C, and 114Y respectively according to each main-scanning magnification correction amount calculated by the CPU 122, so that the LD controllers 114K, 114M, 114C, and 114Y provide respective controls to correct magnification errors in the main-scanning direction. Further, the LD-data output units 133K, 133M, 133C, and 133Y send instructions (LDDATA) to form the correction patterns 14 obtained from the misregistration-correction-pattern generators 132K, 132M, 132C, and 132Y on the transfer belt 3, to the LD controllers 114K, 114M, 114C, and 114Y, respectively. The LD-data output units 133K, 133M, 133C, and 133Y include devices that extremely finely set output frequencies, such as clock generators using voltage-controlled oscillators (VCO) for the colors.

The input-image controllers 127K, 127M, 127C, and 127Y receive image data transferred from the image processing unit 124, store the received image data in the line memories 128K, 128M, 128C, and 128Y, and transfer the stored image data to the write controllers 126K, 126M, 126C, and 126Y, respectively. The input-image controllers 127K, 127M, 127C, and 127Y store the image data in the line memories 128K, 128M, 128C, and 128Y respectively based on the amounts of distorted lines calculated by the CPU 122. The input-image controllers 127K, 127M, 127C, and 127Y receive image data of 1-bit binary images from the image processing unit 124, and transfer the received image data to the write controllers 126K, 126M, 126C, and 126Y, respectively. Here, although the image data for the 1-bit binary images are transferred to the write controllers 126K, 126M, 126C, and 126Y, the present invention is not limited thereto. For example, the image data for binary images may be converted to image data with 4-bit density values (0 (=white pixel) to 15 (=black pixel)), and may be transferred to the write controllers 126K, 126M, 126C, and 126Y.

The line memories 128K, 128M, 128C, and 128Y sequentially store therein image data transferred from the image processing unit 124.

The skew-correction processors 135M, 135C, and 135Y perform skew correction on the image data based on the K color as a reference. The image data (image) in the sub-scanning direction is divided into a plurality of image data based on the main-scanning direction set as one line, and the divided image data are stored in the line memories 128M, 128C, and 128Y. Pixels expressing one-line image in the main-scanning direction are divided, and the divided pixels are shifted in the sub-scanning direction opposite to the skew and are output. Thus, the skew occurring due to formation of the toner image is corrected. The image write processes performed by the write controllers 126K, 126M, 126C, and 126Y are explained in detail below.

First, the image write process for the K color in FIG. 4 is explained below. The write control signal K_IPDATA[7:0]_N is transmitted from the image processing unit 124 to the input-image controller 127K. The input-image controller 127K transmits the write control signal to the write controller 126K while temporarily storing the write control signal in the line memory 128K. In the write controller 126K, the write-image processor 131K transmits the write control signal received from the input-image controller 127K to the LD-data output unit 133K. The LD-data output unit 133K generates a K-color write-image signal K_LDDATA and transmits the signal to the LD controller 114K.

Next, the image write processes for the M, C, and Y colors in FIG. 4 are explained below. First, the write control signals (M, C, Y)_IPDATA[7:0]_N are transmitted from the image processing unit 124 to the input-image controllers 127M, 127C, and 127Y, respectively. Then, to correct skew amounts based on the skew correction amounts stored in the RAM 123, the input-image controllers 127M, 127C, and 127Y temporarily store the write control signals in the line memories 128M, 128C, and 128Y, respectively. The skew-correction processors 135M, 135C, and 135Y execute skew-amount correction processes to the temporarily stored write control signals by using the skew correction amounts, and transmit the corresponding write control signals to the write-image processors 131M, 131C, and 131Y, respectively. Similarly to the operation for the K color, the LD-data output units 133M, 133C, and 133Y having received the write control signals from the write-image processors 131M, 131C, and 131Y generate write-image signals (M, C, Y)_LDDATA and transmit the write-image signals to the LD controllers 114M, 114C, and 114Y, respectively. The skew correction amount will be explained in detail later.

When the correction patterns 14 for misregistration correction are to be output, pattern image signals for the K, M, C, and Y colors are transmitted from the misregistration-correction-pattern generators 132K, 132M, 132C, and 132Y to the LD-data output units 133K, 133M, 133C, and 133Y, respectively. Thereafter, the operations are performed in the same manner as above.

Figure 5:
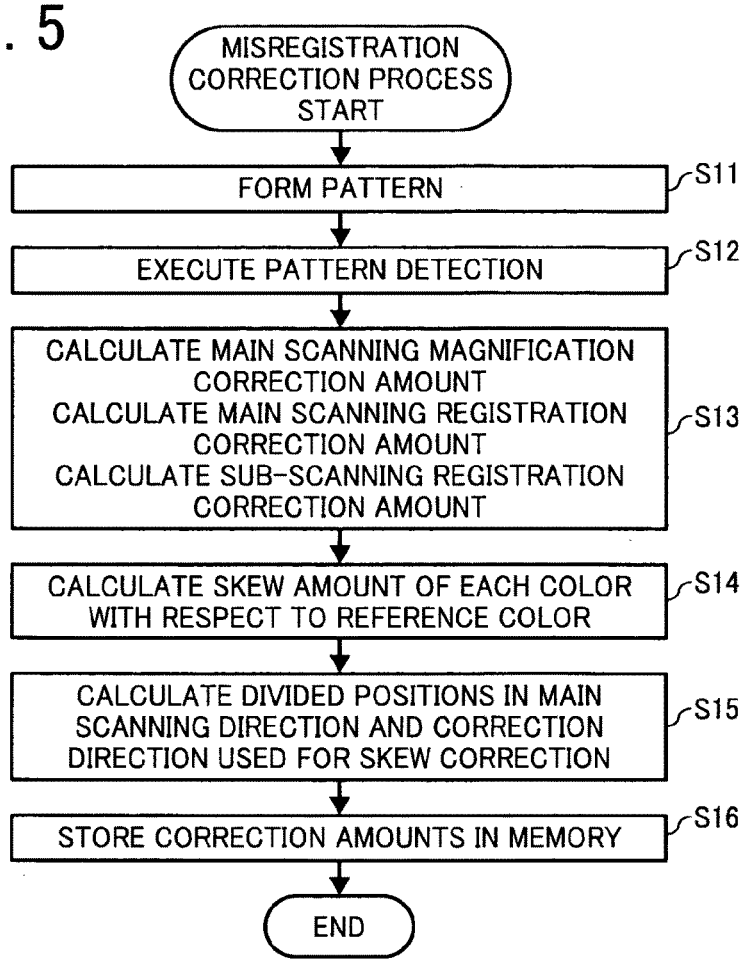
FIG. 5 is a flowchart of a procedure for correction of misregistration.

As explained above, the formation of the color image requires registration among the K, M, C, and Y colors. Therefore, an operation process for misregistration correction is explained below with reference to a flowchart in FIG. 5. The following misregistration correction process is explained based on the K color set as the reference color. The reference color is a color as a reference for correction, and by matching the other colors with the reference color, each misregistration between the relevant colors is corrected.

The misregistration correction process is started, and then, first, at Step S11, the misregistration correction patterns generated by the misregistration-correction-pattern generators 132K, 132M, 132C, and 132Y in the write controllers 126K, 126M, 126C, and 126Y are formed on the transfer belt 3. Next, at Step S12, the detection sensors 15 and 16 detect the correction patterns 14 formed on the transfer belt 3.

Thereafter, at Step S13, the pattern detector 121 detects the correction patterns 14 and converts them to digital data, and the CPU 122 calculates, from the digitized correction patterns, a magnification correction amount in the main-scanning direction (main-scanning magnification correction amount), a registration correction amount in the main-scanning direction (main-scanning registration correction amount), and a registration correction amount in the sub-scanning direction (sub-scanning registration correction amount) with respect to the reference color (K color). At Step S14, the CPU 122 also calculates skew correction amounts for the colors with respect to the reference color (K color), and calculates, at Step S15, divided positions in the main-scanning direction and correction direction (image-shift-position information and image-shift-direction information) used to perform skew correction.

At Step S16, the CPU 122 stores information including the calculated main-scanning magnification correction amount, main-scanning registration correction amount, and sub-scanning registration correction amount, the skew correction amount, and the divided positions in the main-scanning direction and the correction direction for skew correction in the RAM 123 (or a nonvolatile memory), and ends the misregistration correction process. The correction amounts stored in the RAM 123 are used as correction amounts for printing until a next misregistration correction process is executed.

Figure 6:
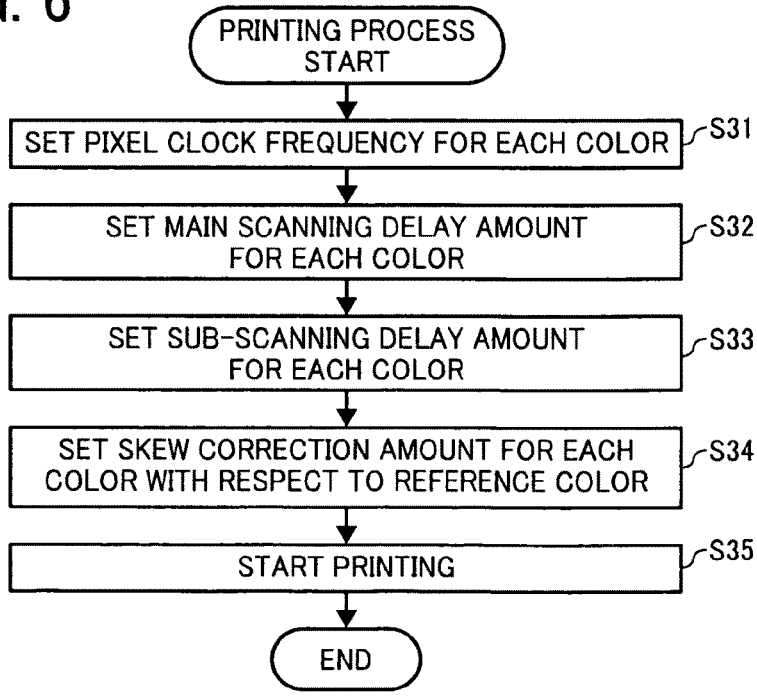
FIG. 6 is a flowchart of an example of a printing procedure.

As explained above, the printing process is performed after the main-scanning magnification correction amount, the main-scanning registration correction amount, the sub-scanning registration correction amount, the skew correction amount, and the divided positions in the main-scanning direction and the correction direction for skew correction of the M, C, and Y colors are stored. FIG. 6 is a flowchart of an example of a printing procedure.

First, at Step S31, when receiving a print request, the write control unit 125 sets each pixel clock frequency for the K, M, C, and Y colors based on the main-scanning magnification correction amount. Then, at Step S32, the write control unit 125 sets each main-scanning delay amount of the colors based on the main-scanning registration correction amount stored in the RAM 123. Further, at Step S33, the write control unit 125 sets each sub-scanning delay amount of the colors based on the sub-scanning registration correction amount stored in the RAM 123.

Thereafter, at Step S34, the write control unit 125 sets each skew correction amount of the M, C, and Y colors with respect to the reference color (K color) based on the skew correction amounts of the colors and the gradation information. At Step S35, the write control unit 125 starts a printing operation while executing image correction based on the set main-scanning pixel clock frequencies, main-scanning delay amounts, sub-scanning delay amounts, and the skew correction amounts for the K, M, C, and Y colors, and ends the printing process.

The color shift correction in the main-scanning direction is performed by correcting the main-scanning magnification and the writing timing in the main-scanning direction. The main-scanning magnification correction is performed by changing image frequencies based on the magnification error amounts of the colors detected by the write control unit 125. The write control unit 125 is provided with a device, for example, a clock generator using the VCO that can extremely finely set frequencies. The writing timing in the main-scanning direction is controlled depending on from which position of a main-scanning counter the LD outputs data. Specifically, the main-scanning counter is operated by using synchronization detection signals for the colors as a trigger.

Figure 7:
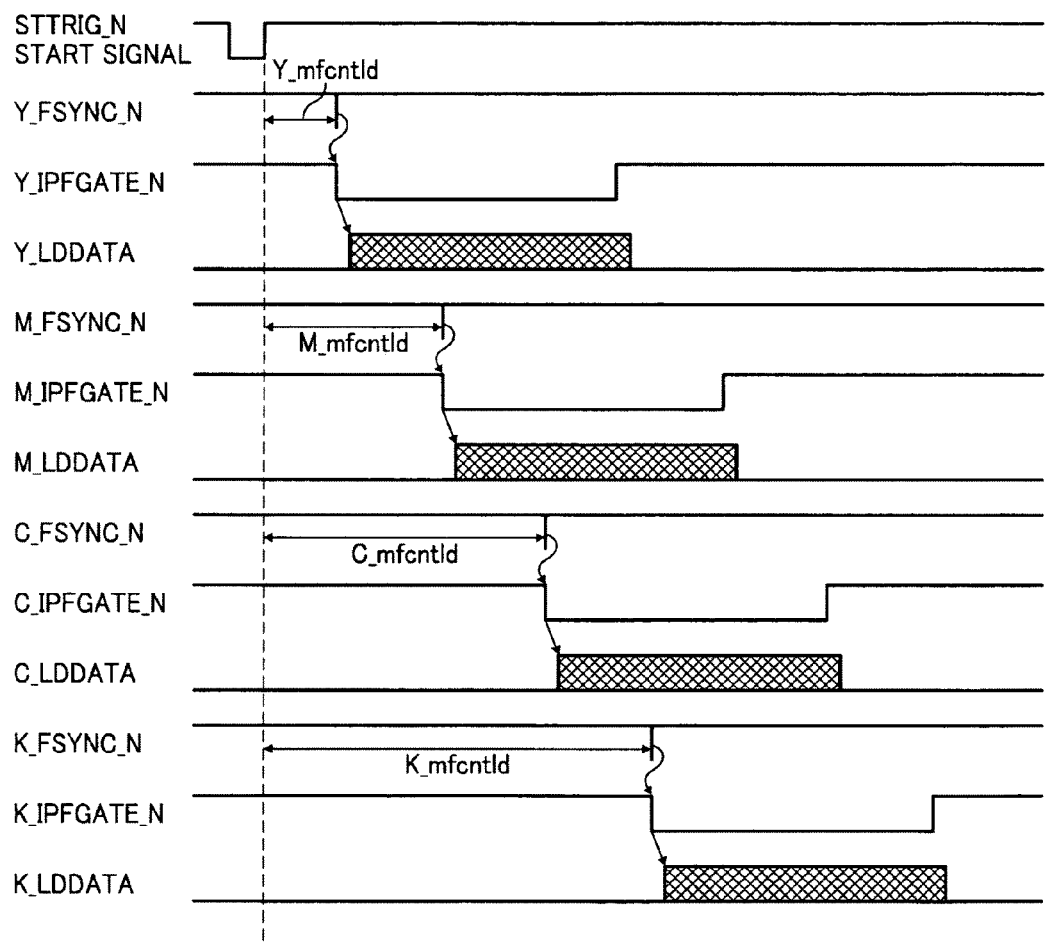
FIG. 7 is a timing chart of an example of that the write control unit performs writing-timing corrections in a sub-scanning direction.

Furthermore, the color shift correction in the sub-scanning direction is performed by controlling a writing timing in the sub-scanning direction. FIG. 7 is a timing chart of an example of that the write control unit performs writing-timing corrections in the sub-scanning direction. In FIG. 7, the write control unit 125 counts the number of lines based on a start signal STTRIG_N, received from the CPU 122, set as a reference, and outputs the sub-scanning timing signals (Y, M, C, K)_FSYNC_N to the image processing unit 124.

Thereafter, the image processing unit 124 outputs the sub-scanning gate signals (Y, M, C, K)_IPFGATE_N to the write control unit 125 by using each reception of the sub-scanning timing signals (Y, M, C, K)_FSYNC_N as a trigger, and transfers the image signals (Y, M, C, K)_IPDATA_N thereto. The write controllers 126Y, 126M, 126C, and 126K transmit the image signals (Y, M, C, K)_LDDATA to the LD controllers 114Y, 114M, 114C, and 114K, respectively.

When the registration in the sub-scanning direction is to be corrected, sub-scanning delay amounts (Y, M, C, K)_mfcntld from the start signal are changed according to the detected misregistration amounts. Generally, the misregistration amount based on the K color as the reference is reflected to the sub-scanning delay amounts of the colors (M, C, K), each timing of the signals (Y, M, C, K)_FSYNC_N is changed to perform registration in the sub-scanning direction.

Figure 8A:
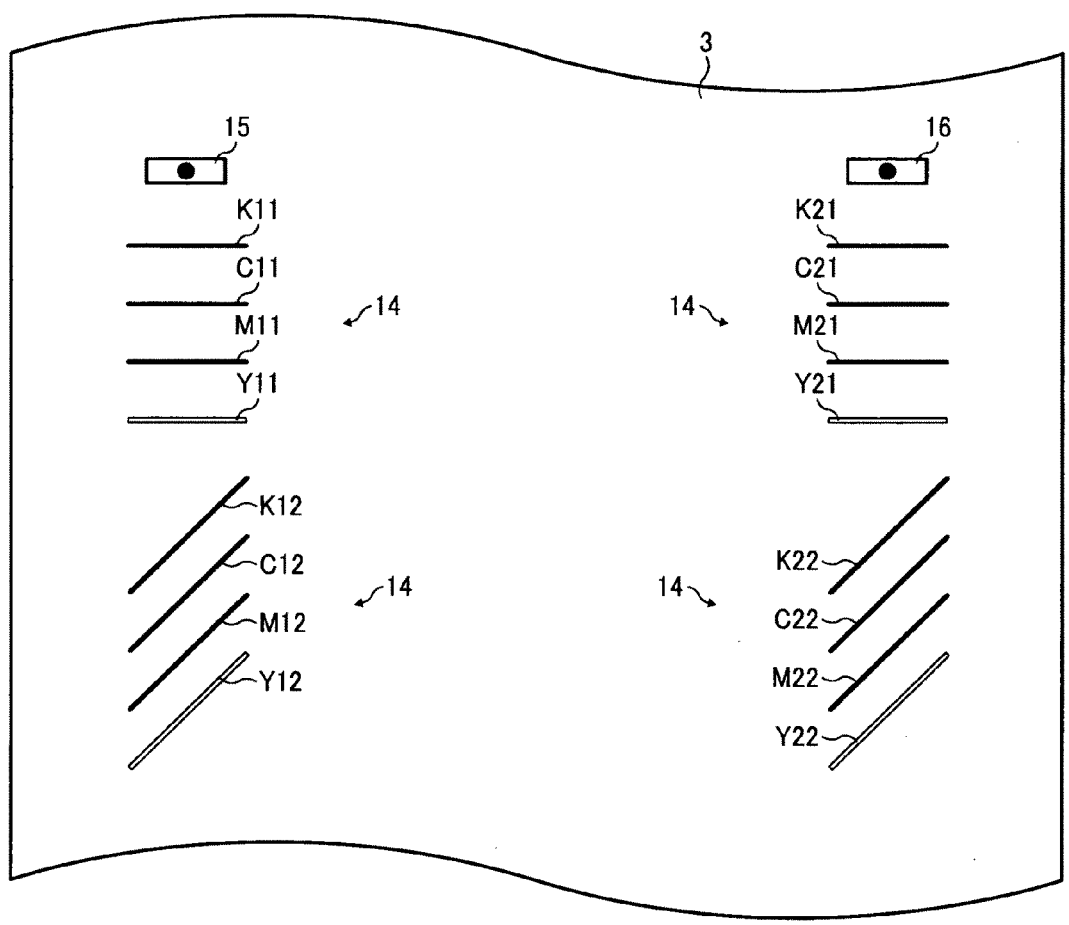
FIG. 8A is a diagram of an example of misregistration correction patterns formed on the transfer belt.

Next, the processes of detecting a misregistration amount and of correcting the amount in the color copier are explained below. FIG. 8A is a diagram of an example of misregistration correction patterns formed on the transfer belt. The correction patterns 14 formed on the transfer belt 3 are detected by the detection sensors 15 and 16 to obtain signals, the obtained signals are converted from analog data to digital data by the pattern detector 121, the digital data is sampled, and the sampled data is stored in the RAM 123. After detections of all the correction patterns 14 are finished, the CPU 122 performs an operation process to calculate various color shift amounts (a main-scanning magnification, a main-scanning registration shift amount, a sub-scanning registration shift amount, a skew) by using the data stored in the RAM 123, and calculates correction amounts of shift components from the color shift amounts, respectively.

Figure 8B:
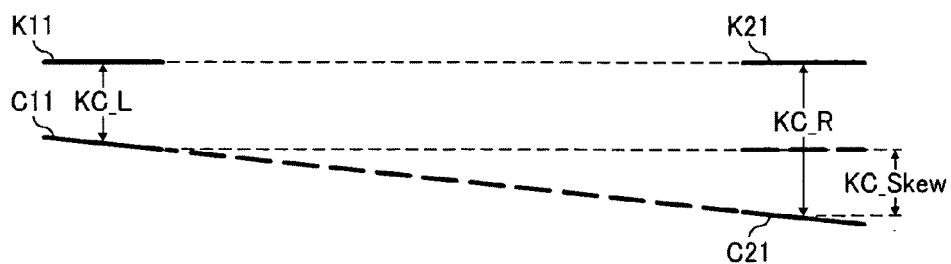
FIG. 8B is a diagram of an example of a method of calculating a skew amount.

The skew correction is explained below. FIG. 8B is a diagram of an example of a method of calculating a skew amount. Here, FIG. 8B represents an example of how to calculate each distortion amount of the colors based on the K color set as the reference color. The skew correction is implemented by determining each skew amount of the colors (M, C, and Y) with respect to the K color being the reference color. For example, as shown in FIG. 8B, a case in which the right side of a C-color image is shifted more downward than its normal position is explained as an example. The detection sensor 15 on the left side detects positions of left-side patterns K11 and C11 formed on the transfer belt 3, and calculates a left-side distance KC_L between the K color and the C color from the detected positional relationship. Meanwhile, the detection sensor 16 on the right side detects positions of right-side patterns K21 and C21 formed on the transfer belt 3, and calculates a right-side distance KC_R between the K color and the C color from the detected positional relationship. Thus, a skew amount of the C color with respect to the K color: KC_Skew is determined from the following Equation (1).

$$KC\_Skew = KC\_R - KC\_L \quad (1)$$

Similarly to the above manner, skew amounts of the M color and of the Y color with respect to the K color: KM_Skew and KY_Skew are calculated from the following Equations (2) and (3) respectively, through respective pattern detections.

$$KM\_Skew = KM\_R - KM\_L \quad (2)$$

$$KY\_Skew = KY\_R - KY\_L \quad (3)$$

In this manner, the skew amounts of the C color, the M color, and the Y color with respect to the K color as the reference: KC_Skew, KM_Skew, and KY_Skew are calculated.

Here, a relationship between a skew amount and a skew correction amount is explained in detail below. FIG. 9A is a diagram of an example of skew amounts of the colors based on the K color as a reference when a resolution in the sub-scanning direction is 600 dots per inch (dpi). The skew amounts of the colors are determined as shown in FIG. 9A by using the Equations (1) to (3). More specifically, the skew amounts of the colors based on the K color as the reference are assumed as M:−110 micrometer (μm), C:−130 micrometer, and Y:30 micrometers. Here, because the resolution in the sub-scanning direction is 600 dpi, shifting by one line allows a shift of 25400 (μm)/600=42.3 (μm). Therefore, a skew correction amount can be determined by dividing each shift amount (skew amount) by the shift per line, rounding a number after the decimal point to obtain each value in integer units, and inverting its sign. FIG. 9B is a diagram of an example of skew correction amounts in the case of FIG. 9A. As shown in FIG. 9B, the skew correction amounts in the case of the skew amounts in FIG. 9A are M:+3 lines, C:+3 lines, and Y:−1 line, respectively.

FIGS. 10A to 10F are diagrams of examples of a skew correction method (a method of calculating a skew correction amount). FIG. 10A is an input image diagram, and eight lines of input images are shown therein. Here, one line shows an image to be stored in a single line memory. FIG. 10B is a diagram of the input image diagram in FIG. 10A which is output as it is as LD data without correcting its skew. As shown in FIG. 10B, when the input image diagram is output as it is as the LD data, a right-side image on the paper is shifted upward by an amount corresponding to three lines due to skew of a scanning beam, as compared with FIG. 10A (i.e., the number of lines as the skew amount is 3).

As explained above, when the right-side image is shifted upward by three lines, as shown in FIG. 10C, the main-scanning direction of the image is divided equally by {(the number of lines as the skew amount)+1}, namely, is quartered. Positions (divided positions) at which the line in the main-scanning direction is divided are called "shift positions", and each area in the main-scanning direction on the line segmented by the shift positions is called "shift area".

As shown in FIG. 10D, if the image is output by shifting a shift area downward line by line each time when the shift area shifts to the right side, as shown in FIG. 10E, the image positions on the right side and the left side of the paper can be made in parallel to each other. Specifically, part of the image is stored in the line memories, the stored image is read while a read position is switched from one to another, and the image (shift area) divided in the main-scanning direction is shifted in the sub-scanning direction, so that the skews of the colors are respectively corrected. Shifting in the sub-scanning direction is called "shift".

FIGS. 11A to 11F are diagrams of another example of the skew correction method (method of calculating the skew correction amount), and represent a skew correction method when a right-side image on the paper is shifted by one line more downward than its normal position in a case in which skew correction is not performed on the input image diagram. In this case, also, by performing the same processes as these in the case of FIGS. 10A to 10E, the skew can be corrected. Specifically, the image is evenly divided in the main-scanning direction, and a shift area is shifted upward line by line each time when the shift area shifts to the right side, so that the image positions on the right side and the left side of the paper are made in parallel to each other as shown in FIG. 11E.

In actual skew correction, input image data are sequentially stored in line memories for skew correction, and the skew-correction processors 135M, 135C, and 135Y switch among data in the line memories 128M, 128C, and 128Y depending on which of the data should be read in each of the divided areas, and thus the image in FIG. 10D or FIG. 11D is output. Therefore, as shown in FIGS. 10F and 11F, information for addresses of shift positions for the colors in the main-scanning direction and for which of a plus (+) direction and a minus (−) direction in the sub-scanning direction each image should be shifted to at each shift position can previously be obtained. The information including the addresses of the shift positions in the main-scanning direction and the shift direction to the plus direction or to the minus direction in the sub-scanning direction at each shift position are called "shift correction information" or "data for skew correction" as shown in FIGS. 10F and 11F.

For example, when the number of pixels in the scanning direction is set to 4800 pixels as shown in FIG. 10C, because the right edge of the image is shifted upward by three lines with respect to the left edge thereof, the image is quartered in the main-scanning direction. Therefore, the pixels are divided into four shift areas with 1 pixel to 1200 pixels, 1201 pixels to 2400 pixels, 2401 pixels to 3600 pixels, and with 3601 pixels to 4800 pixels, and the shift areas are called a first block, a second block, a third block, and a fourth block.

As a result, as shown in FIG. 10D, when the shift area ranges from 0 pixel to 1200 pixels in a first line, the first block of the image data in a first line memory is output, and white pixels are output when the shift area ranges from 1201 pixels to 4800 pixels. When the shift area ranges from 0 pixel to 1200 pixels in a second line, the first block of the image data in a second line memory is output, the second block of the image data in the first line memory is output when the shift area ranges from 1201 pixels to 2400 pixels, and white pixels are output when the shift area ranges from 2401 pixels to 4800 pixels. By repeatedly executing such an image-data output process, an output image can be corrected so that the image positions on the right and the left sides are made in parallel to each other as shown in FIG. 10E.

Figure 12A:
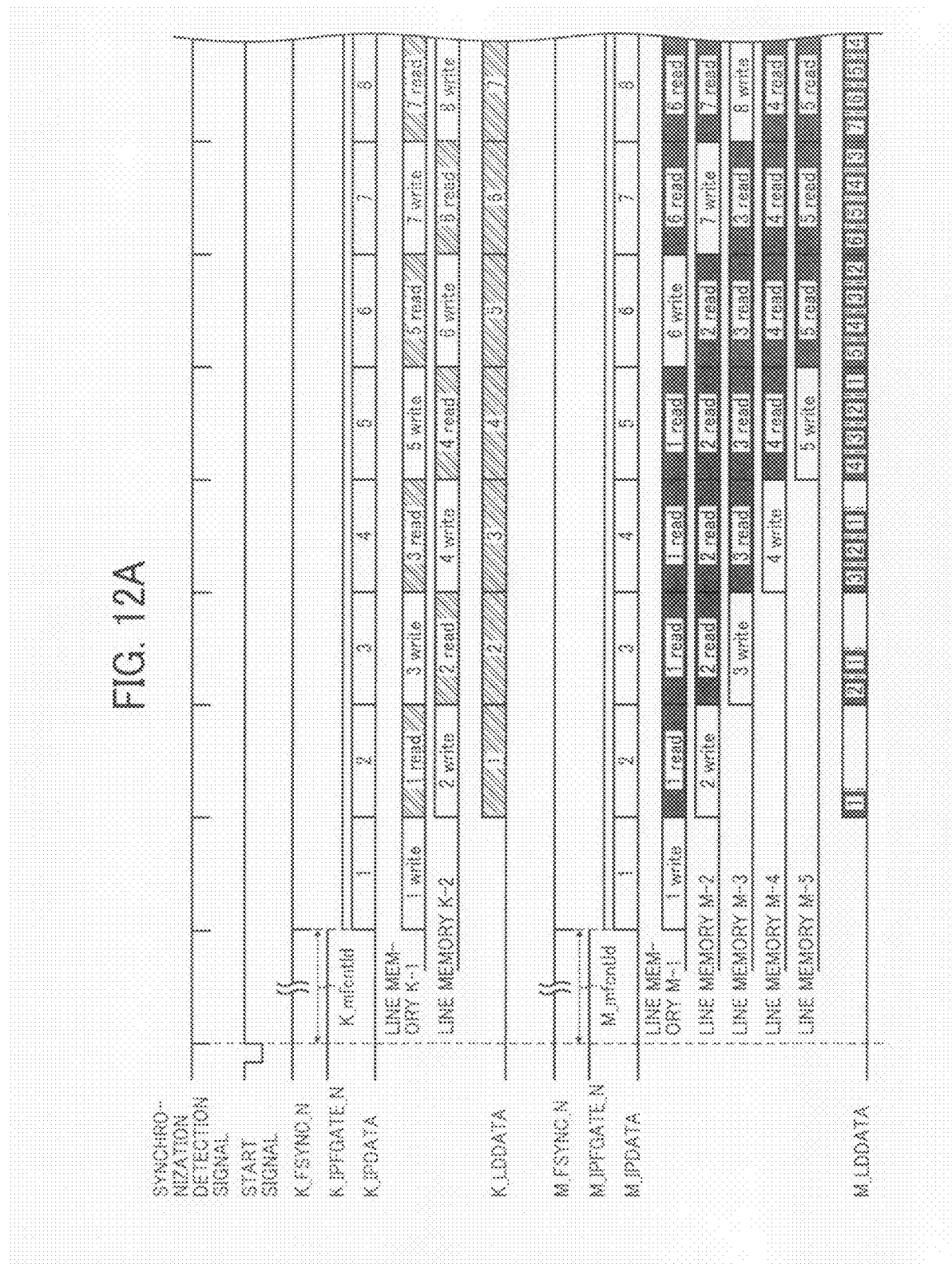
FIG. 12A is a timing chart of line memories when a skew is corrected.

FIGS. 12A and 12B are timing charts of line memories when skews are corrected. Here, the K color is the reference color, and thus, the pixels are not divided. Each skew correction amount for the M color and the C color is three dots, and thus, the correction is performed based on the four divisions. A skew correction amount for the Y color is one dot, and thus, the correction is performed based on two divisions.

In FIGS. 12A and 12B, the input-image controllers 127K, 127M, 127C, and 127Y start printing operations at each timing based on sub-scanning delay amounts (Y, M, C, K)_mfcntld from the start signal sent by the CPU 122, respectively. When the printing operations are started, images are stored in line memories K-1, M-1, C-1, and Y-1.

Subsequently, images are stored in line memories K-2, M-2, C-2, and Y-2, and at the same time, the images are read from the line memories K-1, M-1, C-1, and Y-1. All the pixels are output as a K-color write signal K_LDDATA through the write controller 126K, and the pixels in the first block of the four-divided blocks are output as an M-color write signal M_LDDATA through the write controller 126M. The pixels in the first block of the four-divided blocks are output as a C-color write signal C_LDDATA through the write controller 126C, and the pixels in the first block of the two-divided blocks are output as a Y-color write signal Y_LDDATA through the write controller 126Y.

Thereafter, images are stored in the line memory K-1, line memories M-3, C-3, and Y-3, and at the same time, the images are read from the line memories K-2, M-1, M-2, C-1, C-2, Y-1, and Y-2. All the pixels are output as the K-color write signal K_LDDATA through the write controller 126K. The pixels in the second block of the four-divided blocks in the line memory M-1 and the pixels in the first block of the four-divided blocks in the line memory M-2 are output as the M-color write signal M_LDDATA through the write controller 126M. The pixels in the second block of the four-divided blocks in the line memory C-1 and the pixels in the first block of the four-divided blocks in the line memory C-2 are output as the C-color write signal C_LDDATA through the write controller 126C. The pixels in the second block of the two-divided blocks in the line memory Y-1 and the pixels in the first block of the two-divided blocks in the line memory Y-2 are output as the Y-color write signal Y_LDDATA through the write controller 126Y.

Subsequently, images are stored in line memories K-2, line memories M-4, C-4, and the line memory Y-1, and at the same time, the images are read from the line memories K-1, M-1, M-2, M-3, C-1, C-2, C-3, Y-2, and Y-3. All the pixels are output as the K-color write signal K_LDDATA through the write controller 126K. The pixels in the third block of the four-divided blocks in the line memory M-1, the pixels in the second block of the four-divided blocks in the line memory M-2, and the pixels in the first block of the four-divided blocks in the line memory M-3 are output as the M-color write signal M_LDDATA through the write controller 126M. The pixels in the third block of the four-divided blocks in the line memory C-1, the pixels in the second block of the four-divided blocks in the line memory C-2, and the pixels in the first block of the four-divided blocks in the line memory C-3 are output as the C-color write signal C_LDDATA through the write controller 126C. The pixels in the second block of the two-divided blocks in the line memory Y-2 and the pixels in the first block of the two-divided blocks in the line memory Y-3 are output as the Y-color write signal Y_LDDATA through the write controller 126Y.

Thereafter, images are stored in the line memory K-1, line memories M-5, C-5, and the line memory Y-2, and at the same time, the images are read from the line memories K-2, M-1, M-2, M-3, M-4, C-1, C-2, C-3, C-4, Y-1, and Y-3. All the pixels are output as the K-color write signal K_LDDATA through the write controller 126K. The pixels in the fourth block of the four-divided blocks in the line memory M-1, the pixels in the third block of the four-divided blocks in the line memory M-2, the pixels in the second block of the four-divided blocks in the line memory M-3, and the pixels in the first block of the four-divided blocks in the line memory M-4 are output as the M-color write signal M_LDDATA through the write controller 126M. The pixels in the fourth block of the four-divided blocks in the line memory C-1, the pixels in the third block of the four-divided blocks in the line memory C-2, the pixels in the second block of the four-divided blocks in the line memory C-3, and the pixels in the first block of the four-divided blocks in the line memory C-4 are output as the C-color write signal C_LDDATA through the write controller 126C. The pixels in the second block of the two-divided blocks in the line memory Y-3 and the pixels in the first block of the two-divided blocks in the line memory Y-1 are output as the Y-color write signal Y_LDDATA through the write controller 126Y. The processes are repeatedly executed and the skew-corrected image data are printed.

Because the skew correction explained above is implemented by dividing the image in the main-scanning direction, an adjacency relationship between pixels is changed at each shift position. In this case, a local density is changed at the shift position. The change in the local density is called "density shift". The density shift is particularly significant in an image expressed by a pseudo gradation process such as a dithering method. In a dithering processed image, the local density is periodically changed in the sub-scanning direction at the shift position, and therefore, a significant density shift is recognized.

Here, the dithering process is explained below. To express smooth gradation, the color copier such as a color laser printer has dither matrices for each color, photograph/test, the number of bits for image data, or each resolution. Sizes and patterns of these dither matrices are often different from each other.

The dithering process is a process to express a multiple-gradation image by using binary and binarize a matrix called dithering matrix which is formed with thresholds of N×M pixels (N, M: natural number) by being superimposed on an original image. Because single pixels (dithering matrix size) are very small, these look like different gradation for human eyes. The process for expressing multiple gradations with binary by subjecting the pixels to the process is the dithering process. There is also a multi-value dithering process in which the number of gradations of an output used for the dithering process is not binary but multiple gradations including about 3-step to 16-step gradation. Although an example of a binary image is explained below, the present invention can also be applied to multi-value images.

In electrophotographic recording, a beam diameter of a laser beam is usually widened more than a pixel size, and thus, when image data is output, a toner adhesion area of a recorded image (on a print paper) is spread more than the pixel size. Therefore, when the shift is performed, an area where toner images overlap at a shift position is changed, and the toner adhesion areas thereby change before and after the shift.

For example, when the toner adhesion area is increased due to the shift (or when an area where toner images overlap is decreased), a local density near the shift position becomes high. Meanwhile, when the toner adhesion area is decreased due to the shift (or when an area where toner images overlap is increased), a local density near the shift position becomes low. Because the toner adhesion area is changed only at the shift position, the image near the shift position is degraded before and after the shift. Particularly, in the image subjected to the pseudo gradation process such as the dithering process, frequent changes of the toner adhesion area due to the shift cause stripe-like noises in the sub-scanning direction.

Figure 13A:
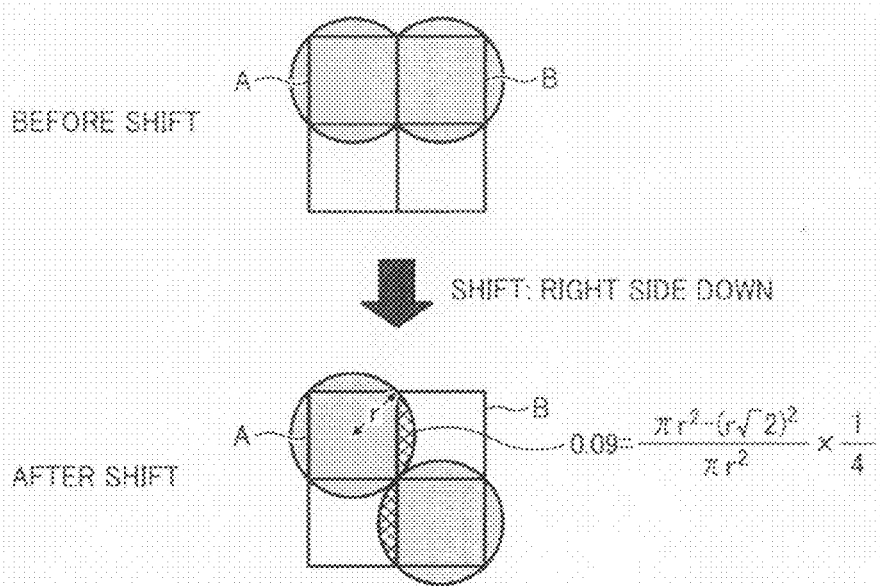
FIG. 13A is a schematic of an example of an image in which an adjacency relationship between pixels at the shift position is changed due to shift.
Figure 13B:
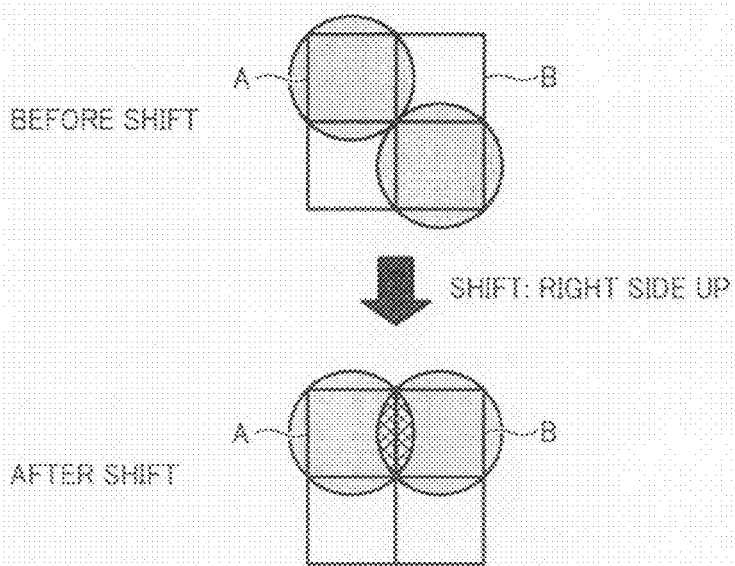
FIG. 13B is a schematic of an example of an image in which an adjacency relationship between pixels at the shift position is changed due to shift.

A specific example of the change of the toner adhesion area due to the shift is explained below. FIGS. 13A and 13B are schematics of examples of an image in which an adjacency relationship between pixels is changed at the shift position due to the shift. It should be noted that FIG. 13A shows a case in which the pixel on the right side is shifted downward and FIG. 13B shows a case in which the pixel on the right side is shifted upward.

The shift in the sub-scanning direction is performed line by line, and thus the image at the shift position is shifted by each one pixel before and after the shift in the sub-scanning direction. Therefore, by performing the shift in the sub-scanning direction, the adjacency relationship between the pixels at the shift position may change. For example, in the case of FIG. 13A, before the shift, a pixel B adjacent to a pixel A being a black pixel is a black pixel. However, after the shift, the pixel B adjacent to the pixel A is changed to a white pixel. In an output image in which the adjacent pixel has changed before and after the shift in the above manner, the toner adhesion area of lattice portions changes before and after the shift, as shown in the case of "after shift" in FIG. 13A.

For example, assuming the toner adhesion area with respect to the pixel A before the shift is 1, by performing the downward shift on the pixel at the shift position as shown in FIG. 13A, an overlapping portion between the toner adhesion portion of the pixel A and the toner adhesion portion of the pixel B before the shift is eliminated, and the toner adhesion area is increased by $0.09 \times 2 = 0.18$ (shaded areas in FIG. 13A), to result in an increase in density. If the increase in the toner adhesion area periodically appears in the sub-scanning direction at the shift position, this causes black stripe-like noises to appear, and the image is thereby degraded.

Likewise, in the case of FIG. 13B, before the shift, the pixel B adjacent to the pixel A being the black pixel is the white pixel. However, after the shift, the pixel B adjacent to the pixel A is changed to the black pixel. In an output image in which the adjacent pixel has changed before and after the shift in the above manner, the toner adhesion area of lattice portions changes before and after the shift, as shown in the case of "after shift" in FIG. 13B.

Consequently, by performing the upward shift on the pixel at the shift position as shown in FIG. 13B, there occurs an overlapping portion between a toner adhesion portion of the pixel A and a toner adhesion portion of the pixel B before the shift, and the toner adhesion area is decreased by $0.09 \times 2 = 0.18$ (shaded areas in FIG. 13B), to result in a decrease in density. If the decrease in the toner adhesion area periodically appears in the sub-scanning direction at the shift position, this causes white stripe-like noises to appear, and the image is thereby degraded.

Figure 14:
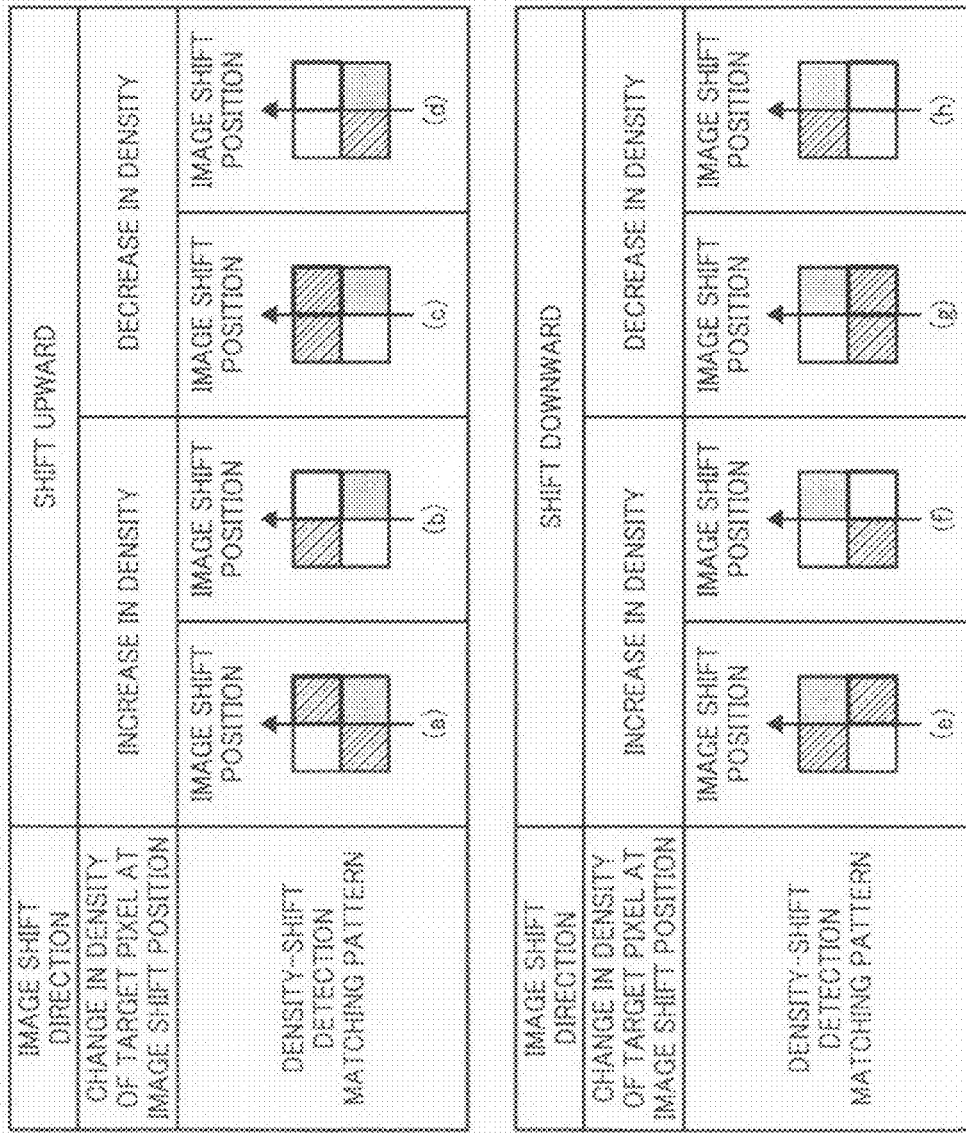
FIG. 14 is a diagram of an example of density-shift detection matching patterns.

To reduce the stripe-like noises caused by the density shift due to the image shift, it is necessary to detect a pixel in which the density-shift occurs and to correct the density shift. As a density-shift detection method, there is known a method of preparing density-shift detection matching patterns each formed with a target pixel and its some surrounding pixels and detecting density shift by using the matching patterns. Japanese Patent No. 3715349 discloses a method of detecting density shift in a binary image using the matching patterns. FIG. 14 is a diagram of an example of density-shift detection matching patterns. In this method, a pixel behind one pixel at the image shift position is set as a target pixel, and density shift is detected by using the matching patterns each formed with the target pixel and its surrounding pixels.

In image shift performed upward, when the target pixel and its surrounding 2×2 pixels match the density-shift detection matching patterns as shown in (a) and (b) in FIG. 14, it is possible to detect that the density of the target pixel is increased (increase in toner adhesion amount) due to the image shift. Likewise, when the pixels match the density-shift detection matching patterns as shown in (c) and (d) in FIG. 14, it is possible to detect that the density of the target pixel is decreased (decrease in toner adhesion amount) due to the image shift.

In image shift performed downward, when the target pixel and its surrounding 2×2 pixels match the density-shift detection matching patterns as shown in (e) and (f) in FIG. 14, it is possible to detect that the density of the target pixel is increased (increase in toner adhesion amount) due to the image shift. Likewise, when the pixels match the density-shift detection matching patterns as shown in (g) and (h) in FIG. 14, it is possible to detect that the density of the target pixel is decreased (decrease in toner adhesion amount) due to the image shift.

The density is corrected by increasing or decreasing output density of the target pixel (or adjacent pixel to the target pixel) where density shift occurs based on the result of the detection, so that the stripe-like noises caused by the density shift due to the image shift is reduced.

In this method, a fixed density correction value is always added or subtracted to or from a detected density-shift generated pixel. However, there may occur a change in density of a recorded image (on a print paper) due to environmental changes such as temperature change and passage of time because of the characteristics of electrophotographic recording. Therefore, if the fixed density correction value is always added or subtracted to or from the density-shift generated pixel due to the image shift, it is impossible to appropriately correct the density, so that stripe-like noises cannot be accurately reduced.

Following embodiments according to the present invention explain a color copier capable of performing optimal image correction by determining a density correction value with which stripe-like noises at a position of the image shift upon skew correction through image processes can be accurately reduced.

Figure 15:
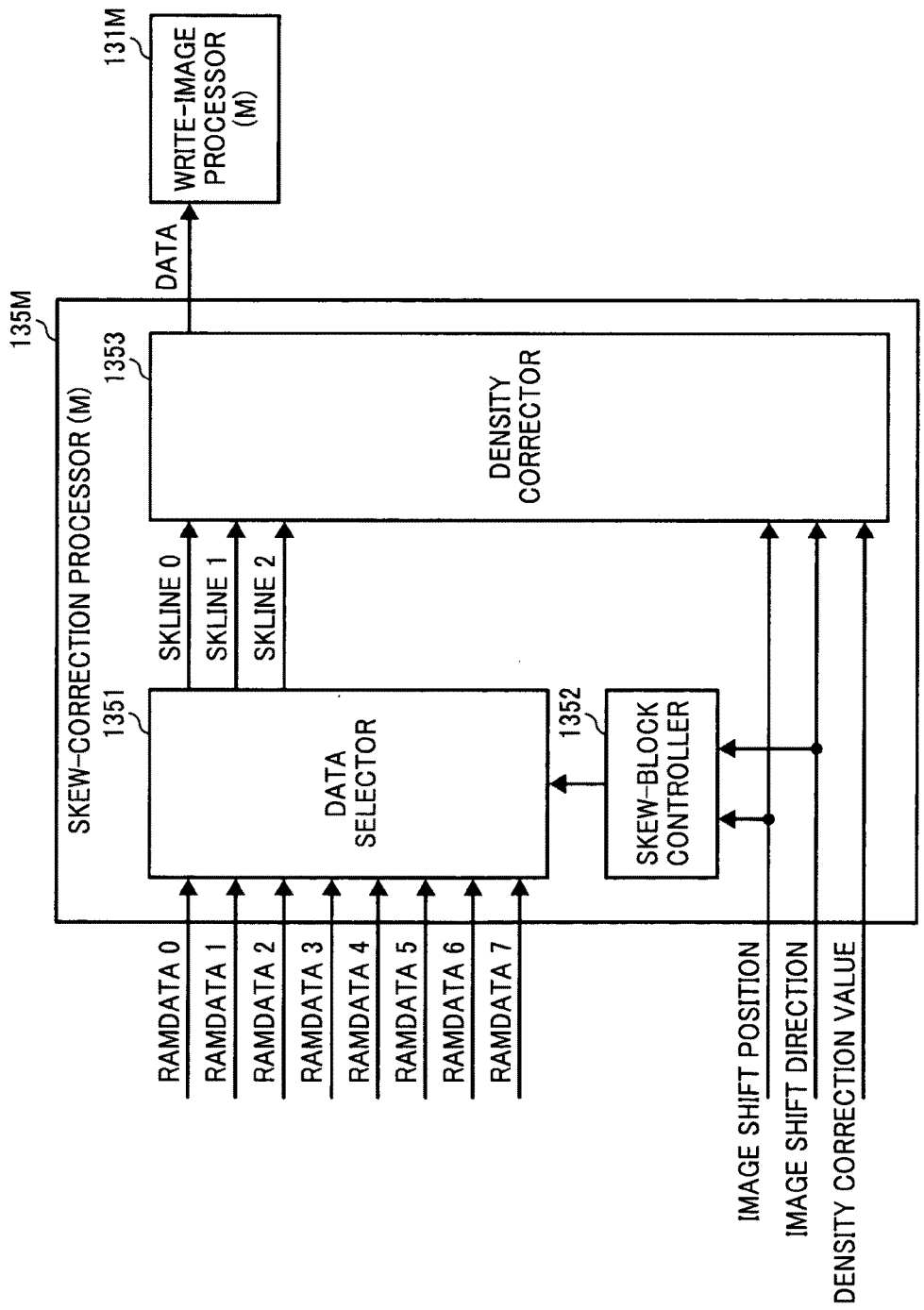
FIG. 15 is a block diagram of a skew-correction processor according to a first embodiment of the present invention.

FIG. 15 is a block diagram of the skew-correction processor 135M according to a first embodiment of the present invention. The skew-correction processor 135M includes a data selector 1351, a skew-block controller 1352, and a density corrector 1353. It should be noted that FIG. 15 shows the skew-correction processor 135M for the M color, however, skew-correction processors for the C color and the Y color have the same configuration as that for the M color.

The data selector 1351 corrects the image data transferred from the input-image controller 127M based on a skew correction value received from the skew-block controller 1352, and transfers the corrected image data to the density corrector 1353.

The skew-block controller 1352 receives the shift correction information (image shift position and image shift direction) from the RAM 123, and calculates a skew correction value. The skew-block controller 1352 outputs the calculated skew correction value to the data selector 1351.

The density corrector 1353 extracts a position, from the image data received from the data selector 1351, where a noise image is recognized near an image shift position based on the shift correction information received from the RAM 123 (or the density corrector 1353 detects a density-shift generated pixel). The density corrector 1353 performs the density correction on the density-shift generated pixel by using a density correction value X received from the RAM 123 so that noise will not occur, and outputs the result to the write-image processor 131M. It should be noted that the density correction value X is previously calculated, and its calculation method will be explained later.

The density corrector 1353 includes a noise-occurrence determination unit and a density correction processor, as specifically described in the appended claims. More specifically, the noise-occurrence determination unit determines whether a target pixel adjacent to a shift position is a "noise generating pixel" that causes a local density to be increased or decreased due to a change in an adjacency relationship between the target pixel and a pixel. The density correction processor performs a density correction process on the target pixel by adding or subtracting the density correction value X to or from the target pixel or its adjacent pixel when it is determined that the target pixel is the noise generating pixel.

Figure 16:
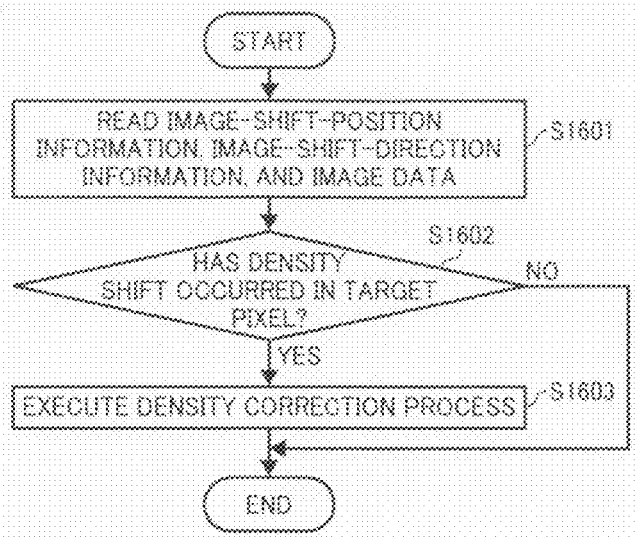
FIG. 16 is a flowchart of an example of a procedure for a density-shift correction process according to the first embodiment.

FIG. 16 is a flowchart of an example of a procedure for a density-shift correction process according to the first embodiment. The process shown in FIG. 16 is performed by the density corrector 1353. First, at Step S1601, the density corrector 1353 reads the image-shift-position information and the image-shift-direction information determined at Step S15 in FIG. 5, and the image data.

Next, at Step S1602, it is determined whether density shift has occurred in the target pixel adjacent to the image shift position and located behind by one pixel, by using the image-shift-position information, the image-shift-direction information determined, and the image data. More specifically, it is determined whether a pixel array in a target area composed of pixels in a predetermined area around the image shift position including the target pixel matches any one of the density-shift detection matching patterns, by using the image-shift-direction information and the density-shift detection matching patterns as shown in FIG. 14.

If the determination at Step S1602 is No or if the pixel array in the target area including the target pixel does not match any one of the density-shift detection matching patterns and no density shift occurs, no process for the density correction is performed as it is, and the process is ended.

If the determination at Step S1602 is Yes or if the pixel array in the target area including the target pixel matches any one of the density-shift detection matching patterns and the density shift occurs, at Step S1603, the density correction process is performed on the target pixel or its adjacent pixel, and then the process is ended. More specifically, the previously calculated density correction value X is added or subtracted to or from the target pixel or its adjacent pixel.

Next, a method of calculating the density correction value X is explained below. As explained above, the calculation of the density correction value X is implemented in the following manner that the detection sensors 15 and 16 detect densities of density-correction determination patches transferred to the transfer belt 3, the pattern detector 121 amplifies an analog detection signal (density detected signal) and converts the analog detection signal to digital data, and the CPU 122 calculates the density correction value X from the digital data being the detection signal.

Figure 17:
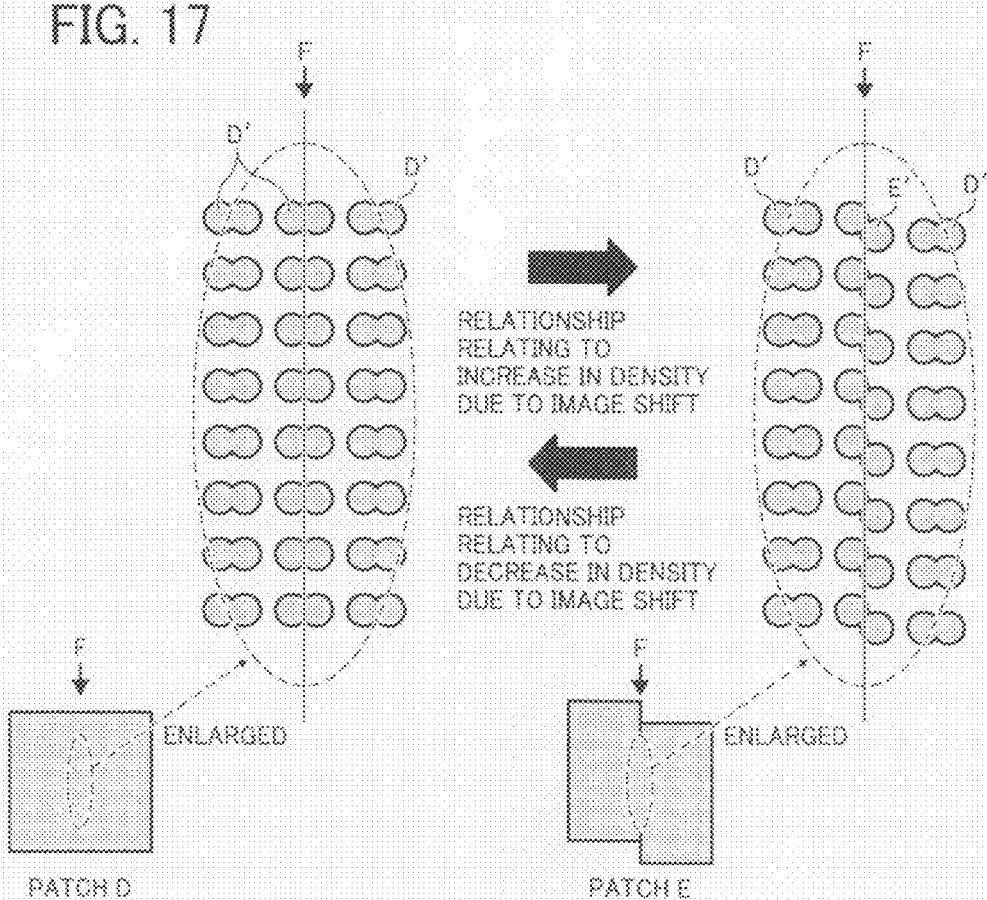
FIG. 17 is a schematic of density-correction-value determination patches used in the first embodiment.

FIG. 17 is a schematic of density-correction-value determination patches used in the first embodiment. The density-correction-value determination patches are two patches: a patch D and a patch E. Areas surrounded by a dotted line in the patches represent areas in which the detection sensors 15 and 16 detect each density of the density-correction-value determination patches. It should be noted that the areas are set for descriptive purposes and actually detectable areas may be different depending on each performance of the detection sensors 15 and 16.

The patch D is formed by repeating the same pixel array, and the area surrounded by the dotted line in the patch D is enlarged to see that pixel arrays D' are regularly arranged in rows.

On the other hand, although the patch E is formed by repeating the same pixel arrays on the right side and the left side along an arrow F, the pixel arrays on the right side of the boundary along the arrow F are shifted downward by each one pixel with respect to the pixel arrays on the left side. Therefore, the area surrounded by the dotted line in the patch E is enlarged to see that the pixel arrays D' are regularly arranged in rows on the right side and the left side of the arrow F, however, pixel arrays E' are vertically regularly arranged only in a portion along the arrow F.

As for the pixel array D' in the patch D and the pixel array E' in the patch E, it is understood that the pixel array D' is the same as the pixel array composed of the pixel A and the pixel B before the shift in FIG. 13A (the pixel array composed of the pixel A and the pixel B after the shift in FIG. 13B). It is also understood that the pixel array E' is the same as the pixel array composed of the pixel A and the pixel B after the shift in FIG. 13A (the pixel array composed of the pixel A and the pixel B before the shift in FIG. 13B). Therefore, the change from the pixel array D' to the pixel array E' indicates an increase in the density (increase in the toner adhesion area) due to the image shift, and the change from the pixel array E' to the pixel array D' indicates a decrease in the density (decrease in the toner adhesion area) due to the image shift.

Accordingly, the density correction value X when the density is increased or decreased due to the image shift can be calculated from the density of the patch D in which only the pixel arrays D' are arranged and from the density of the patch E in which the pixel arrays E' and the pixel arrays D' are arranged. The density correction value X is determined from following Equation (4).

$$X = (\alpha/\beta) \times (|XD - XE|) \qquad (4)$$

Where $\alpha$ is the number of gradations expressing one pixel (dot), and therefore, when, for example, 16 steps of 0 to 15 are used to express the one pixel, $\alpha=16$. Furthermore, $\beta$ is a resolution of the detection sensor for density, XD is a density value of the density in the patch D detected by the detection sensors 15 and 16, and XE is a density value of the density in the patch E detected by the detection sensors 15 and 16.

Figure 18:
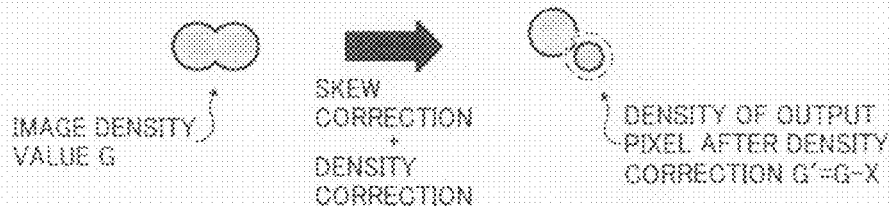
FIG. 18 is a schematic for explaining correction (skew correction and density correction) actually performed by the skew-correction processor when a density corrector detects an increase in the density.

FIG. 18 is a schematic for explaining correction (skew correction and density correction) actually performed by a skew-correction processor 135 when the density corrector 1353 detects an increase in the density. When detecting the increase in density, the density corrector 1353 sets a pixel density value of the target pixel after the skew correction to G'=G−X, where G is a pixel density value of the target pixel before the skew correction.

However, if the pixel density value of the target pixel cannot be increased or decreased, then the pixel density value of an adjacent pixel to the target pixel is changed. The pixel density value mentioned here represents a density value of one pixel, which indicates a density data value sent from the printer controller 111 or from the scanner controller 112 to the engine controller 113 and sent from the engine controller 113 to an LD controller 114 (K, M, C, Y). The skew-correction processor 135 (M, C, Y) outputs the result of the skew correction (and the density correction) to a write-image processor 131 (M, C, Y). It should be noted that the decrease in the pixel density value indicates that a drawing area of the pixels is reduced on an actual paper.

Figure 19:
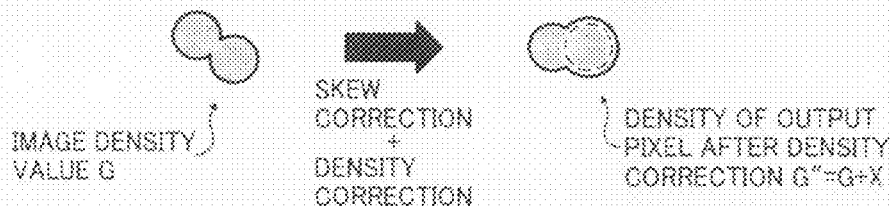
FIG. 19 is a schematic for explaining correction (skew correction and density correction) actually performed by the skew-correction processor when the density corrector detects a decrease in the density.

FIG. 19 is a schematic for explaining correction (skew correction and density correction) actually performed by the skew-correction processor 135 when the density corrector 1353 detects a decrease in the density. When detecting the decrease in the density, the density corrector 1353 determines a pixel density value of the target pixel after the skew correction to G"=G+X, where G is a pixel density value of the target pixel before the skew correction. However, if the pixel density value of the target pixel cannot be increased or decreased, then the pixel density value of an adjacent pixel to the target pixel is changed. The skew-correction processor 135 outputs the result of the skew correction (and the density correction) to the write-image processor 131. It should be noted that the increase in the pixel density value indicates that a drawing area of the pixels is increased on an actual paper.

Figure 20:
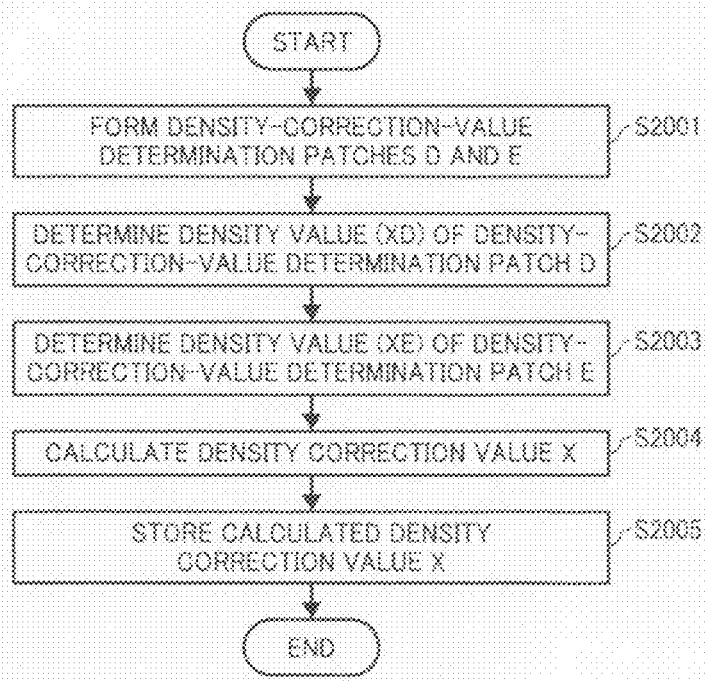
FIG. 20 is a flowchart of an example of a procedure for a density-correction-value calculation process according to the first embodiment.

FIG. 20 is a flowchart of an example of a procedure for a density-correction-value calculation process according to the first embodiment. First, density-correction-value determination patches D and E are formed on the transfer belt 3 (Step S2001). Then, the detection sensors 15 and 16 detect a density value (XD) of the density-correction-value determination patch D (Step S2002). Next, the detection sensors 15 and 16 detect a density value (XE) of the density-correction-value determination patch E (Step S2003). Next, the CPU 122 calculates a density correction value X from the density value (XD) and the density value (XE) (Step S2004). Lastly, the CPU 122 stores the calculated density correction value X in the RAM 123 (Step S2005), and ends the density-correction-value calculation process.

The density-correction-value calculation process is executed when the power is turned on, when a mode is returned to a power saving mode, after a predetermined time passes, or after temperature is changed. By doing so, it is possible to obtain a density correction value according to the change in the density of a recorded image (on the print paper) due to environmental changes which are the characteristics of the electrophotography.

In the procedure according to the first embodiment, after the density value (XD) of the density-correction-value determination patch D is detected, the density value (XE) of the density-correction-value determination patch E is detected, however, the processes may be performed in a reverse procedure. Alternatively, detection of the density value (XD) and detection of the density value (XE) may be simultaneously performed by using separate detection sensors.

Furthermore, an image before the skew correction (and the density correction) and an image after the skew correction (and the density correction) are formed on the transfer belt 3, and the detection sensors 15 and 16 detect density values of relevant portions of the images. By checking that the both density values are equal (or close) to each other, it is possible to confirm that appropriate density correction can be performed.

As explained above, the image forming apparatus according to the first embodiment is capable of performing the density correction process by adding or subtracting a density correction value calculated from the density-correction determination patches to or from a noise generating pixel, even if the noise (density shift) occurs caused by the skew correction. Therefore, it is possible to prevent degradation of image quality after the skew correction by sufficiently reducing the stripe-like noises.

There are cases in which the stripe-like noises, being the density shift caused by the skew correction performed in the image process, sometimes look differently in a recorded image (on the print paper) depending on the number of pixels adjacent to the density-shift generated pixel. Therefore, a second embodiment of the present invention explains a case of calculating a density correction value by using patches with pixel arrays, for the density-correction-value determination patches, allowing for the density-shift generated pixel caused by the skew correction process performed in the image process and for its adjacent pixel. A configuration of a color copier according to the second embodiment is the same as that of the first embodiment.

Figure 21:
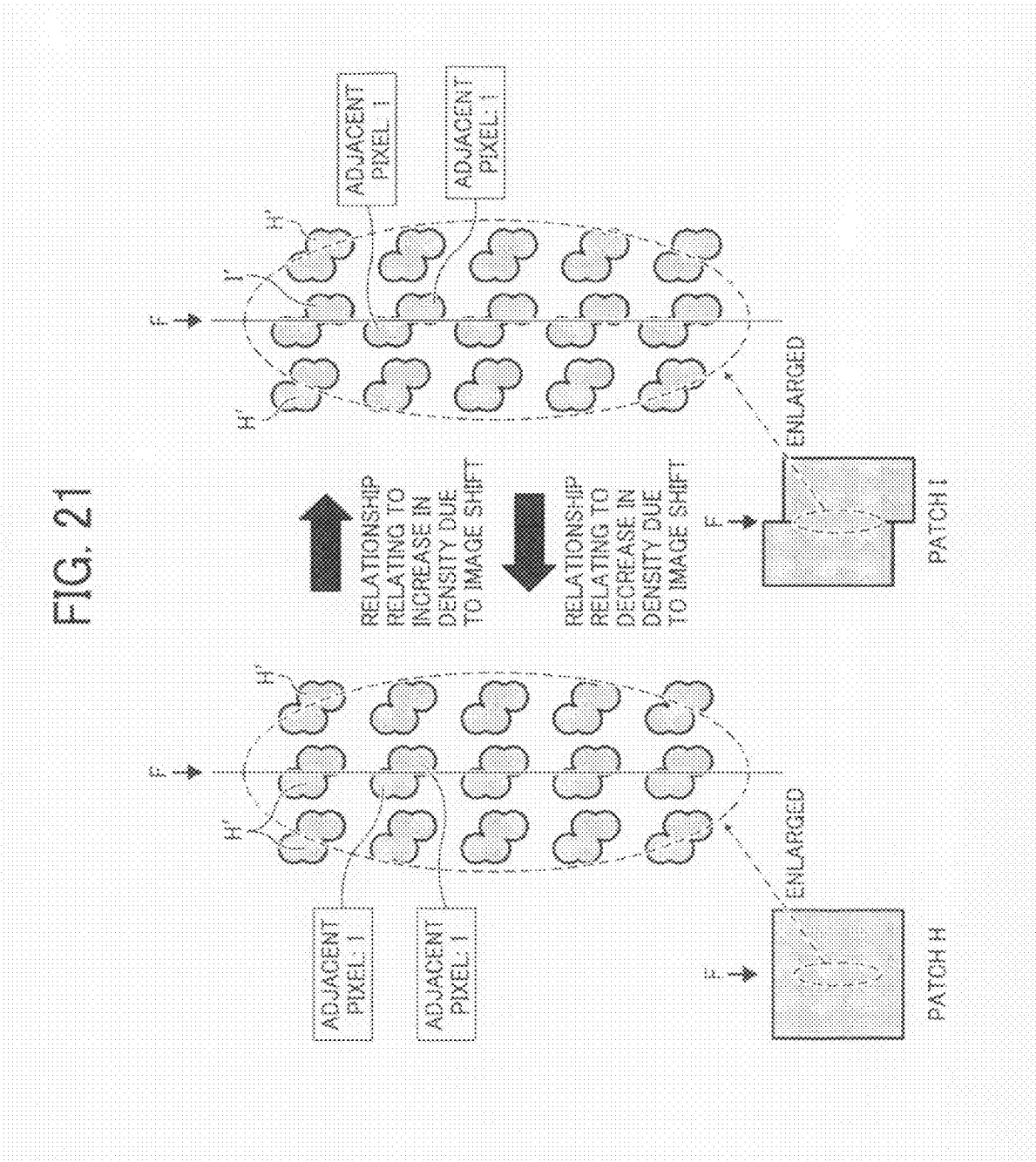
FIG. 21 is a schematic of density-correction-value determination patches with pixel arrays when there is one adjacent pixel to a density-shift generated pixel used in a second embodiment of the present invention.

FIG. 21 is a schematic of density-correction-value determination patches with pixel arrays used in the second embodiment when there is one adjacent pixel to a density-shift generated pixel. The density-correction-value determination patches are two patches: a patch H and a patch I. Areas surrounded by each dotted line in the patches represent areas in which densities of the density-correction-value determination patches are detected by the detection sensors 15 and 16. It should be noted that the areas are set for descriptive purposes and actually detectable areas may be different depending on each performance of the detection sensors 15 and 16.

The patch H is formed by repeating the same pixel array, and the area surrounded by the dotted line in the patch H is enlarged to see that pixel arrays H' are regularly arranged in rows.

On the other hand, although the patch I is formed by repeating the same pixel arrays on the right side and the left side of an arrow F, the pixel arrays on the right side of the boundary along the arrow F are shifted downward by each one pixel with respect to the pixel arrays on the left side. Therefore, the area surrounded by the dotted line in the patch I is enlarged to see that the pixel arrays H' are regularly arranged in rows on the right side and the left side of the arrow F, however, pixel arrays I' are vertically regularly arranged only in a portion along the arrow F.

As for the pixel array H' in the patch H and the pixel array I' in the patch I, it is understood that the pixel array H' is the same as the pixel array composed of the pixel A and the pixel B before the shift in FIG. 13A (the pixel array composed of the pixel A and the pixel B after the shift in FIG. 13B) except for each one adjacent pixel. It is also understood that the pixel array I' is the same as the pixel array composed of the pixel A and the pixel B after the shift in FIG. 13A (the pixel array composed of the pixel A and the pixel B before the shift in FIG. 13B) except for each one adjacent pixel. Therefore, the change from the pixel array H' to the pixel array I' indicates an increase in the density (increase in the toner adhesion area) due to the image shift, and the change from the pixel array I' to the pixel array H' indicates a decrease in the density (decrease in the toner adhesion area) due to the image shift.

Figure 22:
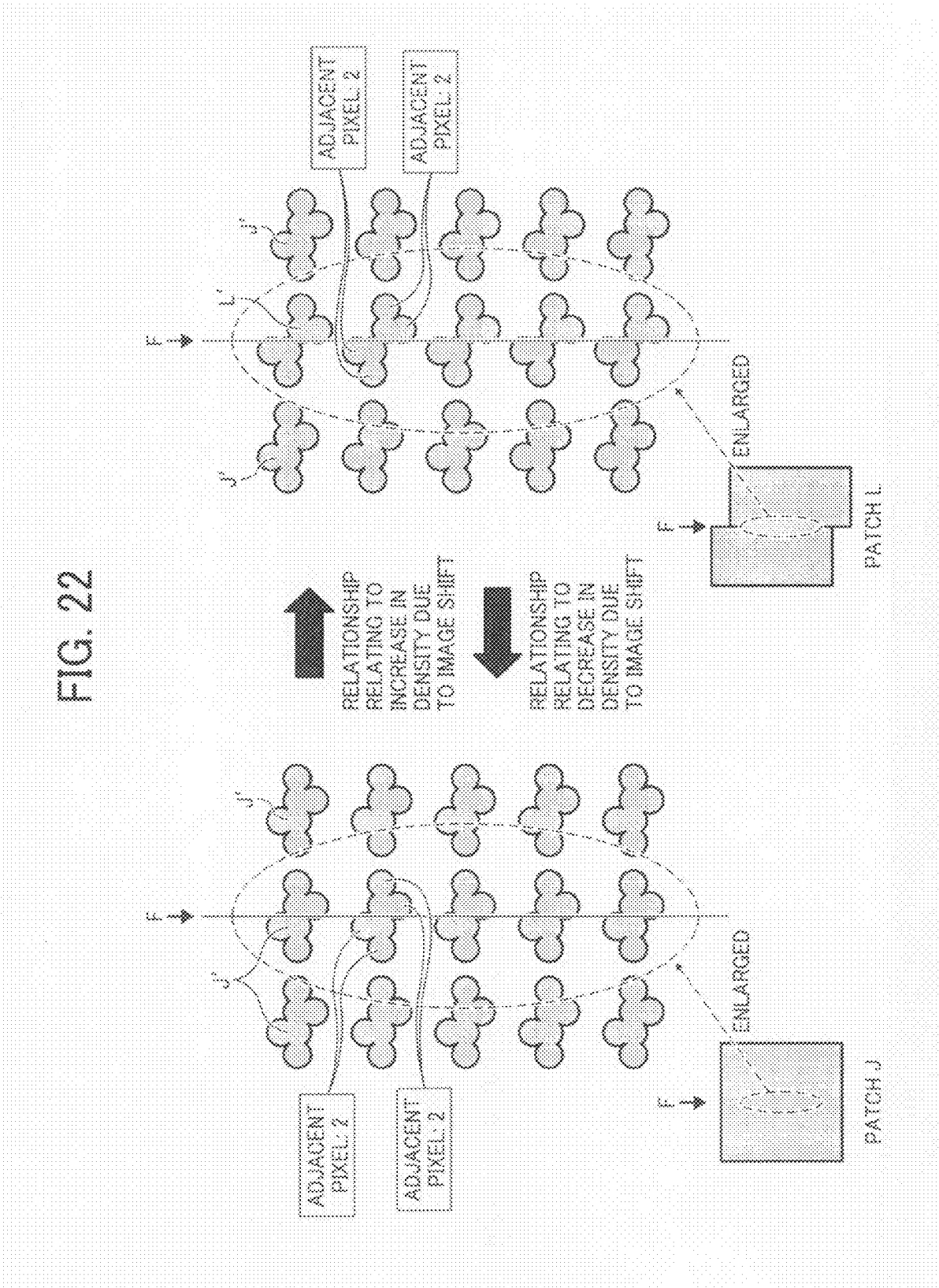
FIG. 22 is a schematic of density-correction-value determination patches with pixel arrays when there are two adjacent pixels to the density-shift generated pixel used in the second embodiment.

FIG. 22 is a schematic of density-correction-value determination patches with pixel arrays used in the second embodiment when there are two adjacent pixels to the density-shift generated pixel. The density-correction-value determination patches are two patches: a patch J and a patch L. Areas surrounded by each dotted line in the patches represent areas in which densities of the density-correction-value determination patches are detected by the detection sensors 15 and 16. It should be noted that the areas are set for descriptive purposes and actually detectable areas may be different depending on each performance of the detection sensors 15 and 16.

The patch J is formed by repeating the same pixel array, and the area surrounded by the dotted line in the patch J is enlarged to see that pixel arrays J' are regularly arranged in rows.

On the other hand, although the patch L is formed by repeating the same pixel arrays on the right side and the left side along an arrow F, the pixel arrays on the right side of the boundary along the arrow F are shifted downward by each one pixel with respect to the pixel arrays on the left side. Therefore, the area surrounded by the dotted line in the patch L is enlarged to see that the pixel arrays J' are regularly arranged in rows on the right side and the left side of the arrow F, however, pixel arrays L' are vertically regularly arranged only in a portion along the arrow F.

As for the pixel array J' in the patch J and the pixel array L' in the patch L, it is understood that the pixel array J' is the same as the pixel array composed of the pixel A and the pixel B before the shift in FIG. 13A (the pixel array composed of the pixel A and the pixel B after the shift in FIG. 13B) except for each two adjacent pixels. It is also understood that the pixel array L' is the same as the pixel array composed of the pixel A and the pixel B after the shift in FIG. 13A (the pixel array composed of the pixel A and the pixel B before the shift in FIG. 13B) except for each two adjacent pixels. Therefore, the change from the pixel array J' to the pixel array L' indicates an increase in the density (increase in the toner adhesion area) due to the image shift, and the change from the pixel array L' to the pixel array J' indicates a decrease in the density (decrease in the toner adhesion area) due to the image shift.

In the second embodiment, a plurality of density-correction-value determination patches with pixel arrays when the density-shift generated pixel has 1 to n adjacent pixels are transferred to the transfer belt 3, and the detection sensors 15 and 16 detect density values of all the density-correction-value determination patches. The CPU 122 calculates a density correction value X for each density-correction-value determination patch, and stores the calculated density correction values in the RAM 123. It should be noted that a value "n" can be arbitrarily set according to performance or the like of the color copier.

Here, let $X_0$ be a density correction value when the density-shift generated pixel has no adjacent pixel (adjacent pixel=0), let $X_1$ be a density correction value when the adjacent pixel=1, let $X_2$ be a density correction value when the adjacent pixel=2, and then, let $X_n$ be a density correction value when the adjacent pixel=n. For example, let XJ be the density correction value of the density-correction determination patch J in FIG. 22, and let XL be the density correction value of the density-correction determination patch L therein. Then, the density correction value $X_2$ is $X_2=(\alpha/\beta)\times(|XJ-XL|)$ from Equation (4) as explained in the first embodiment. The density corrector 1353 performs the density-shift correction process by using any one of the density correction values $X_0$ to $X_n$ according to an instruction from the printer controller 111.

In this case, two methods are considered: a method in which the density corrector 1353 receives all the density correction values $X_0$ to $X_n$ from the RAM 123 and receives an instruction as to which of the density correction values is be used from the printer controller 111; and a method in which the density corrector 1353 receives only the density correction value instructed by the printer controller 111, from the RAM 123.

Figure 23:
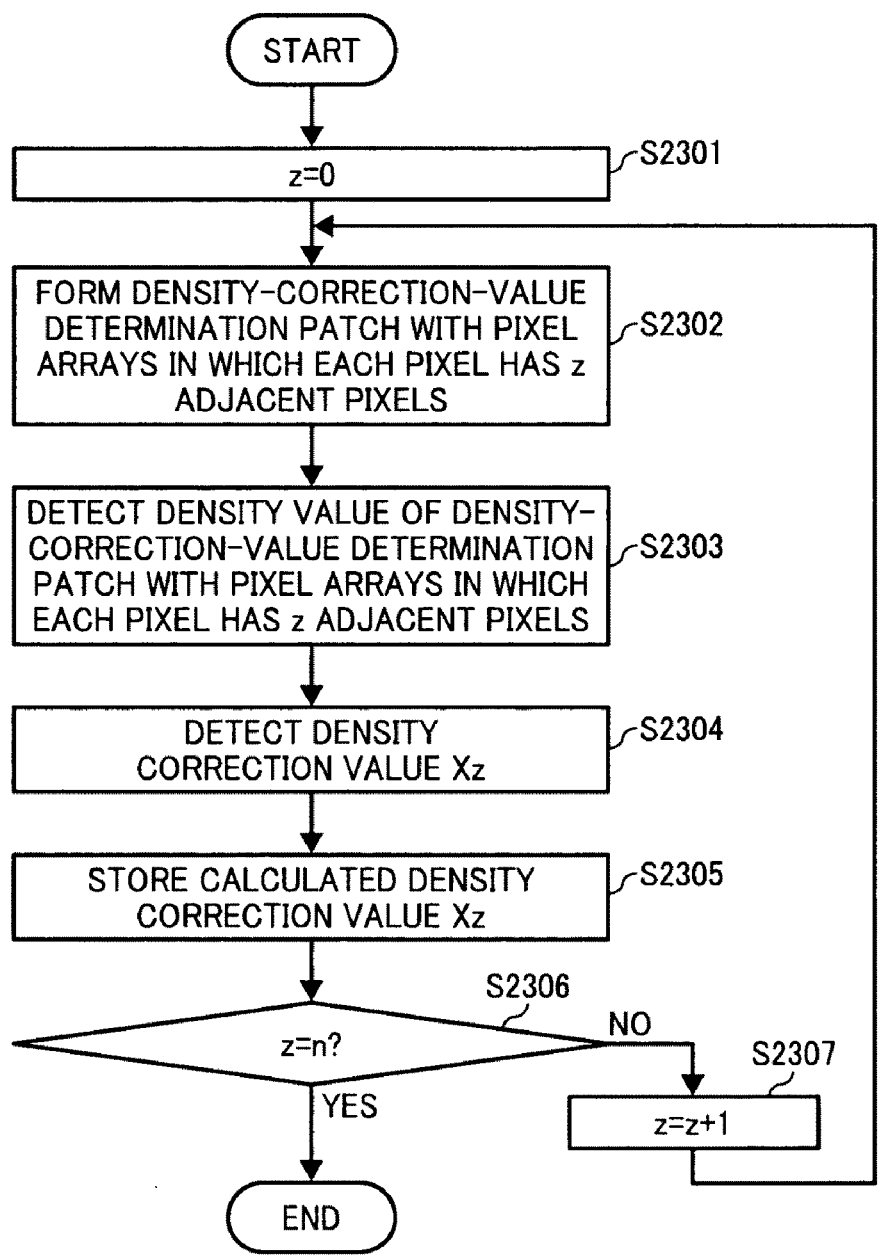
FIG. 23 is a flowchart of an example of a procedure for a density-correction-value calculation process according to the second embodiment.

FIG. 23 is a flowchart of an example of a procedure for a density-correction-value calculation process according to the second embodiment. First, z=0 is set (Step S2301), then, density-correction-value determination patches with pixel arrays in which each pixel has z adjacent pixels are formed on the transfer belt 3 (Step S2302). In an actual case, two types of density-correction-value determination patches are formed thereon. Next, the detection sensors 15 and 16 detect density values of the density-correction-value determination patches in which each pixel has z adjacent pixels (Step S2303). It should be noted that the density values of the two types of density-correction-value determination patches are actually detected.

Next, the CPU 122 calculates a density correction value Xz from the density values of the two types of density-correction-value determination patches (Step S2304). The CPU 122 stores the calculated density correction value Xz in the RAM 123 (Step S2305). Next, when z is not n (z≠n) or when not all the density correction values for all the set density-correction-value determination patches are calculated (NO at Step S2306), z=z+1 is set (Step S2307), and the process is returned to Step S2302. When z=n or when all the density correction values for all the set density-correction-value determination patches are calculated (YES at Step S2306), then the density-correction-value calculation process is ended.

The density-correction-value calculation process is executed when the power is turned on, when a mode is returned to a power saving mode, after a predetermined time passes, or after temperature is changed. By doing so, it is possible to obtain a density correction value according to the change in the density of a recorded image (on the print paper) due to environmental changes which are the characteristics of the electrophotography.

As explained above, in the image forming apparatus according to the second embodiment, the density correction value can be calculated by using the patches with pixel arrays, for the density-correction-value determination patches, allowing for the density-shift generated pixel caused by the skew correction process performed in the image process and its adjacent pixel. Thus, appropriate density correction can be performed, which allows prevention of degradation in image quality after the skew correction by satisfactorily reducing the stripe-like noises.

There are cases in which the stripe-like noises, being the density shift caused by the skew correction performed in the image process, sometimes look differently on the print paper depending on a gradation processing method for the image. Therefore, a third embodiment of the present invention explains a case of calculating a density correction value by using patches with pixel arrays, for the density-correction-value determination patches, before and after the skew correction through various gradation processing methods. A configuration of a color copier according to the third embodiment is the same as that of the first embodiment except for the skew-correction processor.

Figure 24:
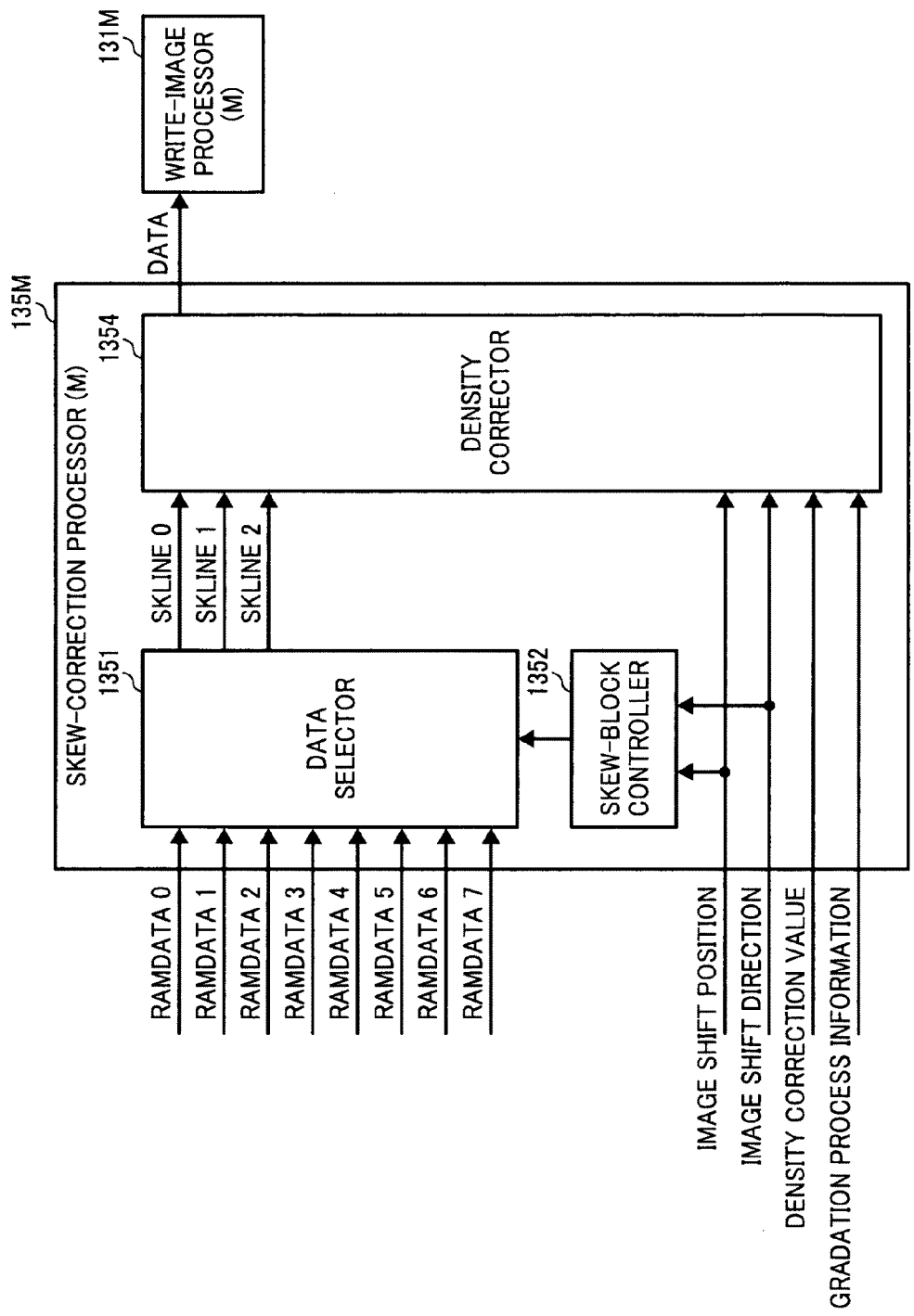
FIG. 24 is a block diagram of a skew-correction processor according to a third embodiment of the present invention.

FIG. 24 is a block diagram of the skew-correction processor 135M according to the third embodiment. The skew-correction processor 135M includes the data selector 1351, the skew-block controller 1352, and a density corrector 1354. It should be noted that FIG. 24 shows the skew-correction processor 135M for the M color, however, skew-correction processors for the C color and the Y color have the same configuration as that for the M color.

The density corrector 1354 extracts a position, from the image data received from the data selector 1351, where a noise image is recognized near an image shift position based on the shift correction information (image shift position and image shift direction) received from the RAM 123 (or the density corrector 1354 detects a density-shift generated pixel). The density corrector 1354 performs the density correction on the density-shift generated pixel by using the density correction value received from the RAM 123 so that noise will not occur based on gradation process information for the image received from the printer controller 111, and outputs the result to the write-image processor 131M. It should be noted that the gradation process information according to the third embodiment is an actually performed gradation processing method for the image such as a dot-concentrated-type dithering method or a line-type dithering method.

The density corrector 1354 includes a noise-occurrence determination unit and a density correction processor, as specifically described in the appended claims. More specifically, the noise-occurrence determination unit determines whether a target pixel adjacent to a shift position is a "noise generating pixel" that causes a local density to be increased or decreased due to a change in an adjacency relationship between pixels. The density correction processor performs a density correction process on the target pixel by adding or subtracting the density correction value X to or from the target pixel or its adjacent pixel when it is determined that the target pixel is the noise generating pixel.

Figure 25:
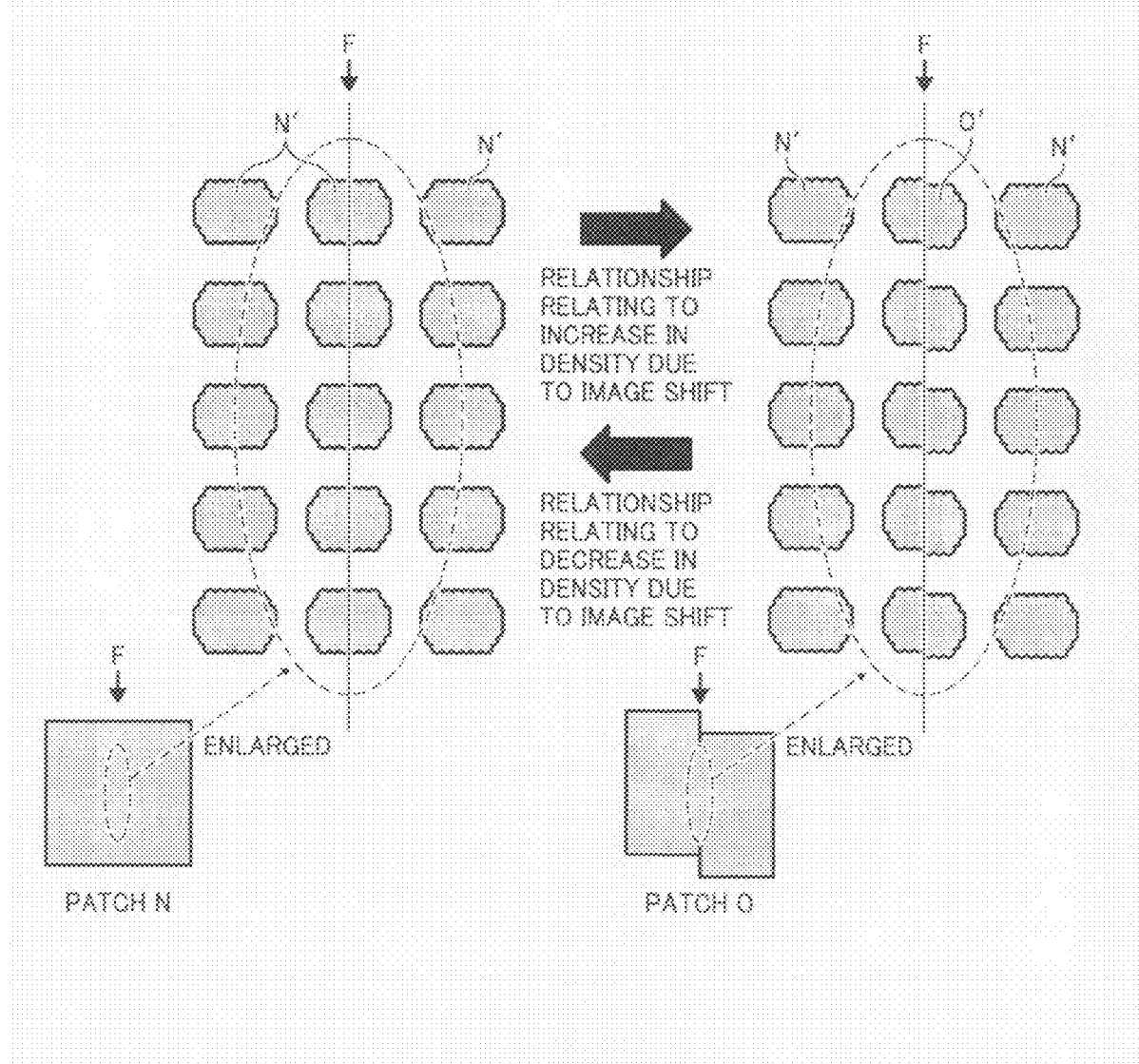
FIG. 25 is a schematic of density-correction-value determination patches in a case of performing a gradation process by using a dot-concentrated-type dithering method used in the third embodiment.

FIG. 25 is a schematic of density-correction-value determination patches in a case of performing a gradation process by using a dot-concentrated-type dithering method used in the third embodiment. The density-correction-value determination patches are two patches: a patch N and a patch O. Areas surrounded by each dotted line in the patches represent areas in which densities of the density-correction-value determination patches are detected by the detection sensors 15 and 16. It should be noted that the areas are set for descriptive purposes and actually detectable areas may be different depending on each performance of the detection sensors 15 and 16.

The patch N is formed by repeating the same pixel array, and the area surrounded by the dotted line in the patch N is enlarged to see that pixel arrays N' are regularly arranged in rows.

On the other hand, although the patch O is formed by repeating the same pixel arrays on the right side and the left side of an arrow F, the pixel arrays on the right side of the boundary along the arrow F are shifted downward by each one pixel with respect to the pixel arrays on the left side. Therefore, the area surrounded by the dotted line in the patch O is enlarged to see that the pixel arrays N' are regularly arranged in rows on the right side and the left side of the arrow F, however, pixel array O' are vertically regularly arranged only in a portion along the arrow F.

As for the pixel array N' in the patch N and the pixel array O' in the patch O, similarly to the first and the second embodiments, it is understood that a relationship between the pixel arrays in the patches N and O is equivalent to the relationship between the pixel arrays before and after the image shift. Therefore, the change from the pixel array N' to the pixel array O' indicates an increase in the density (increase in the toner adhesion area) due to the image shift, and the change from the pixel array O' to the pixel array N' indicates a decrease in the density (decrease in the toner adhesion area) due to the image shift.

Figure 26:
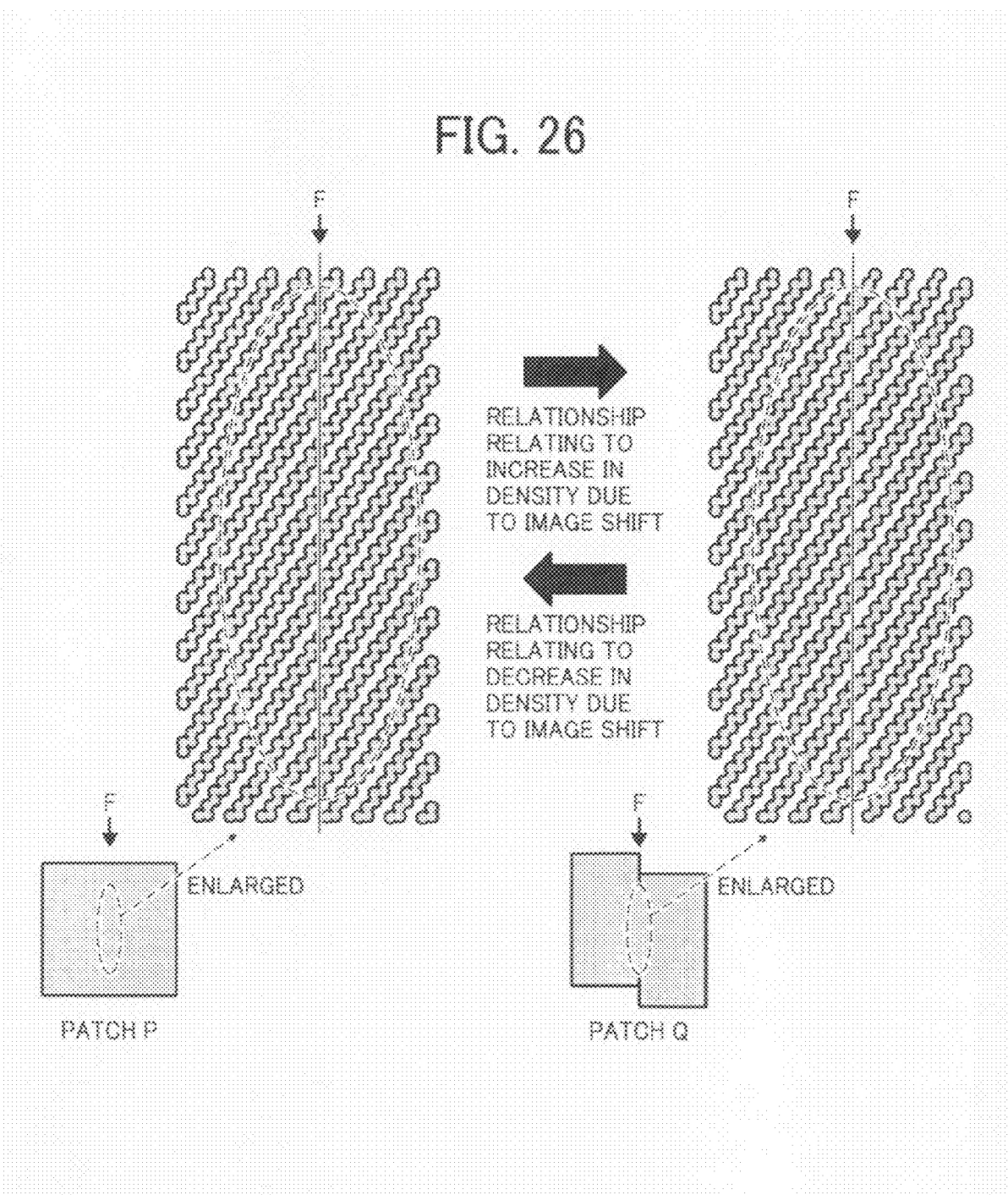
FIG. 26 is a schematic of density-correction-value determination patches in a case of performing a gradation process by using a line-type dithering method used in the third embodiment.

FIG. 26 is schematic of density-correction-value determination patches in a case of performing a gradation process by using the line-type dithering method used in the third embodiment. The density-correction-value determination patches are two patches: a patch P and a patch Q. Areas surrounded by each dotted line in the patches represent areas in which densities of the density-correction-value determination patches are detected by the detection sensors 15 and 16. It should be noted that the areas are set for descriptive purposes and actually detectable areas may be different depending on each performance of the detection sensors 15 and 16.

The patch P is formed by repeating the same pixel array, and the area surrounded by the dotted line in the patch P is enlarged to see that pixels are regularly arranged.

On the other hand, although the patch Q is formed by repeating the same pixel arrays on the right side and the left side of an arrow F, the pixel arrays on the right side of the boundary along the arrow F are shifted downward by each one pixel with respect to the pixel arrays on the left side. Therefore, the area surrounded by the dotted line in the patch Q is enlarged to see that the pixel arrays are vertically shifted by each one pixel between the right side and the left side along the boundary indicated by the arrow F.

As for each one pixel on the right side and the left side of the boundary in the patch P and each one pixel on the right side and the left side of the boundary in the patch Q, similarly to the first and the second embodiments, it is understood that a relationship between the pixels in the patch P and a relationship between the pixels in the patch Q are equivalent to the relationship between the pixel arrays before and after the image shift. Therefore, the change from the patch P to the patch Q indicates an increase in the density (increase in the toner adhesion area) due to the image shift, and the change from the patch Q to the patch P indicates a decrease in the density (decrease in the toner adhesion area) due to the image shift.

In the third embodiment, the density-correction-value determination patches when the gradation process using the dot-concentrated-type dithering method is used and the density-correction-value determination patches when the gradation process using the line-type dithering method is used are transferred to the transfer belt 3 respectively, and the detection sensors 15 and 16 detect density values of all the density-correction-value determination patches. The CPU 122 calculates a density correction value X for each density-correction-value determination patch, and stores the calculated density correction value X in the RAM 123. The density corrector 1354 uses either one of the density correction value X based on the dot-concentrated-type dithering method or the density correction value X based on the line-type dithering method to perform the density-shift correction process.

The density corrector 1353 may receive only the density correction value X obtained by using the gradation processing method instructed by the printer controller 111, from the RAM 123, and perform the density-shift correction process.

As explained above, in the image forming apparatus according to the third embodiment, the density correction value can be calculated by using the patches with the pixel arrays before and after the skew correction in the various gradation processing methods for the density-correction-value determination patches. Thus, an appropriate density correction process can be performed, which allows prevention of degradation in image quality after the skew correction by satisfactorily reducing the stripe-like noises.

There are cases in which the stripe-like noises, being the density shift caused by the skew correction performed in the image process, sometimes look differently on the print paper depending on the number of dither lines and a screen angle when the gradation processing method for the image is the line-type dithering method. Therefore, a fourth embodiment of the present invention explains a case of calculating a density correction value by using patches with pixel arrays, for the density-correction-value determination patches, before and after the skew correction with various numbers of dither lines and at screen angles. A configuration of a color copier according to the fourth embodiment is the same as that of the third embodiment.

Figure 27:
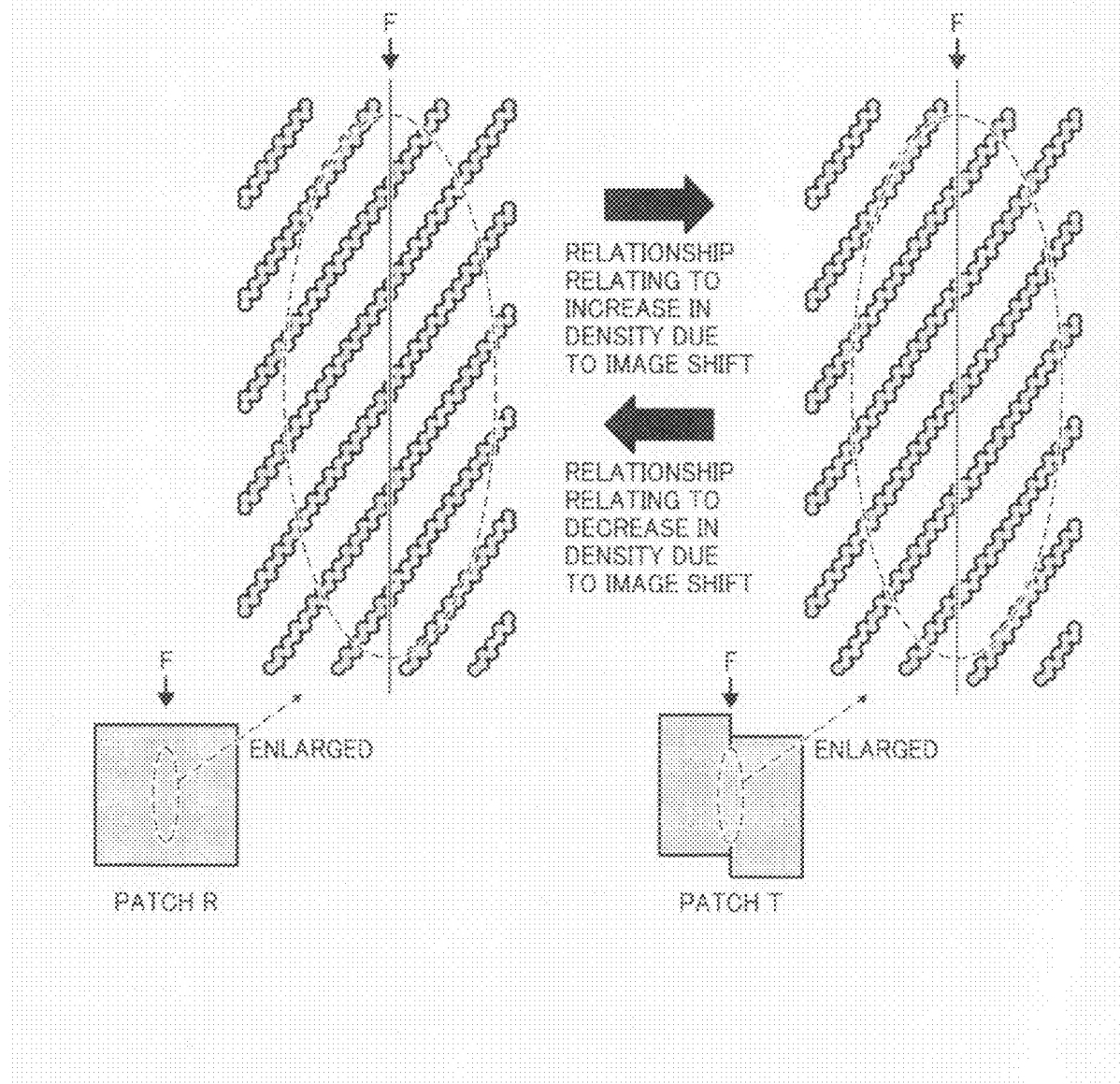
FIG. 27 is a schematic of density-correction-value determination patches in a case of performing a gradation process by using a line-type dithering method used in a fourth embodiment of the present invention.

FIG. 27 is a schematic of density-correction-value determination patches in a case of performing a gradation process by using the line-type dithering method used in the fourth embodiment. The density-correction-value determination patches are obtained by reducing the lines used in the line-type dithering method from each of the density-correction determination patches explained with reference to FIG. 26 according to the third embodiment, and are two patches: a patch R and a patch T. Areas surrounded by each dotted line in the patches represent areas in which densities of the density-correction-value determination patches are detected by the detection sensors 15 and 16. It should be noted that the areas are set for descriptive purposes and actually detectable areas may be different depending on each performance of the detection sensors 15 and 16.

The patch R is formed by repeating the same pixel array, and the area surrounded by the dotted line in the patch R is enlarged to see that pixels are regularly arranged.

On the other hand, although the patch T is formed by repeating the same pixel arrays on the right side and the left side along an arrow F, the pixel arrays on the right side of the boundary along the arrow F are shifted downward by each one pixel with respect to the pixel arrays on the left side. Therefore, the area surrounded by the dotted line in the patch T is enlarged to see that the pixel arrays are vertically shifted by each one pixel between the right side and the left side along the boundary indicated by the arrow F.

As for each one pixel on the right side and the left side of the boundary in the patch R and each one pixel on the right side and the left side of the boundary in the patch T, similarly to the first to the third embodiments, it is understood that a relationship between the pixels in the patch R and a relationship between the pixels in the patch T are equivalent to the relationship between the pixel arrays before and after the image shift. Therefore, the change from the patch R to the patch T indicates an increase in the density (increase in the toner adhesion area) due to the image shift, and the change from the patch T to the patch R indicates a decrease in the density (decrease in the toner adhesion area) due to the image shift.

Figure 28:
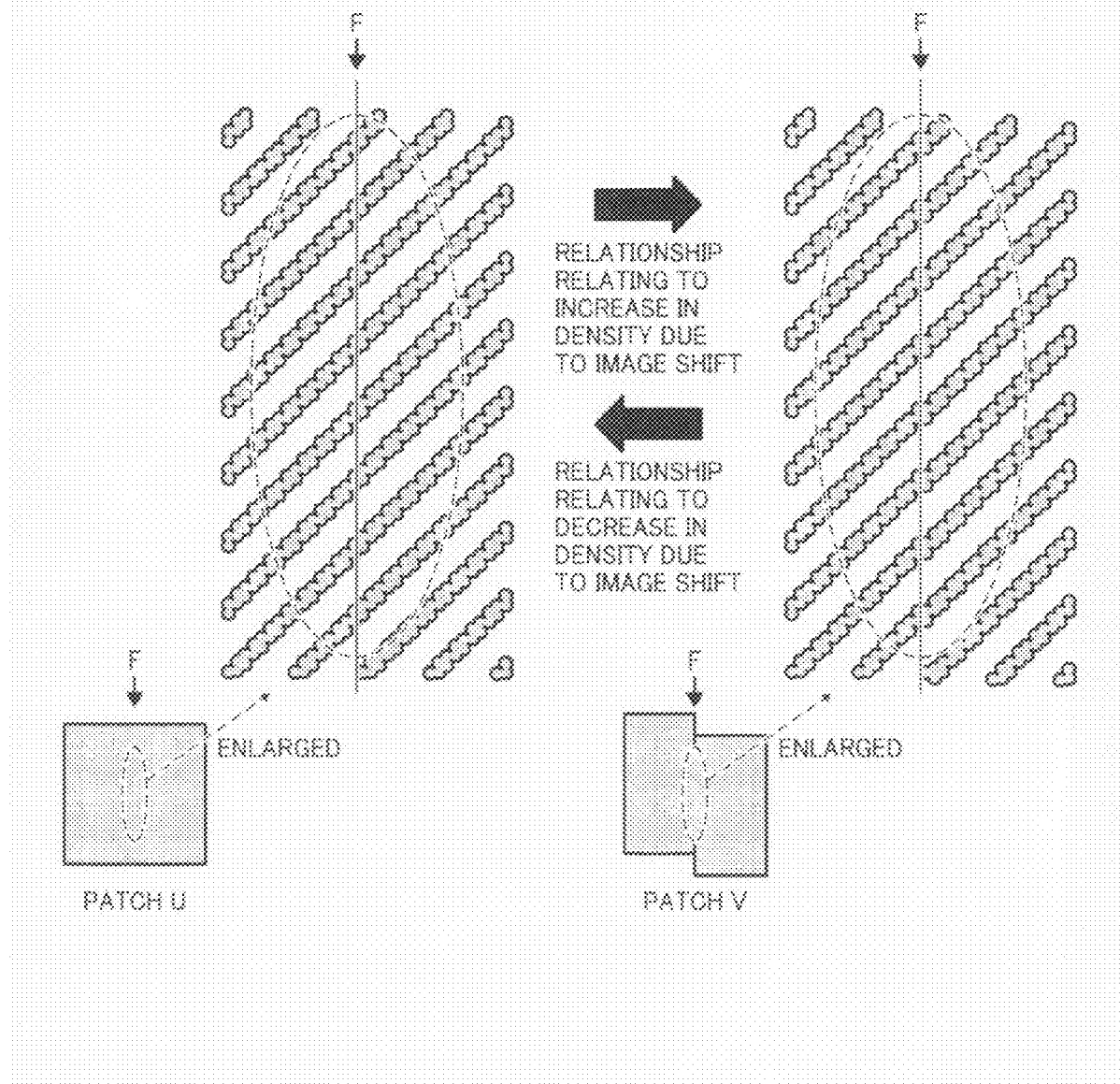
FIG. 28 is a schematic of density-correction-value determination patches in a case of performing a gradation process by using the line-type dithering method used in the fourth embodiment.

FIG. 28 is schematic of density-correction-value determination patches in a case of performing a gradation process by using the line-type dithering method used in the fourth embodiment. The density-correction-value determination patches are patches in which the screen angle used in the line-type dithering method is changed from the density-correction determination patches explained with reference to FIG. 27, and are two patches: a patch U and a patch V. Areas surrounded by each dotted line in the patches represent areas in which densities of the density-correction-value determination patches are detected by the detection sensors 15 and 16. It should be noted that the areas are set for descriptive purposes and actually detectable areas may be different depending on each performance of the detection sensors 15 and 16.

The patch U is formed by repeating the same pixel array, and the area surrounded by the dotted line in the patch U is enlarged to see that pixels are regularly arranged.

On the other hand, although the patch V is formed by repeating the same pixel arrays on the right side and the left side of an arrow F, the pixel arrays on the right side of the boundary along the arrow F are shifted downward by each one pixel with respect to the pixel arrays on the left side. Therefore, the area surrounded by the dotted line in the patch V is enlarged to see that the pixel arrays are vertically shifted by each one pixel between the right side and the left side along the boundary indicated by the arrow F.

As for each one pixel on the right side and the left side of the boundary in the patch U and each one pixel on the right side and the left side of the boundary in the patch V, similarly to the first to the third embodiments, it is understood that a relationship between the pixels in the patch U and a relationship between the pixels in the patch V are equivalent to the relationship between the pixel arrays before and after the image shift. Therefore, the change from the patch U to the patch V indicates an increase in the density (increase in the toner adhesion area) due to the image shift, and the change from the patch V to the patch U indicates a decrease in the density (decrease in the toner adhesion area) due to the image shift.

In the fourth embodiment, the density-correction-value determination patches formed with the various lines and screen angles as explained with reference to FIGS. 26 to 28 when the gradation process using the line-type dithering method is used are transferred to the transfer belt 3 respectively, and the detection sensors 15 and 16 detect density values of all the density-correction-value determination patches. The CPU 122 calculates a density correction value X for each density-correction-value determination patch, and stores the calculated density correction values X in the RAM 123. The density corrector 1354 uses any one of the density correction values X based on the line-type dithering method according to an instruction (gradation process information) from the printer controller 111, to perform the density-shift correction process. When the gradation processing method of the image is the line-type dithering method, the gradation process information according to the fourth embodiment represents information for the number of lines in the line-type dithering method or for an screen angle or the like.

It should be noted that the density corrector 1353 may receive only the density correction value X based on the line-type dithering method instructed by the printer controller 111, from the RAM 123, and perform the density-shift correction process.

As explained above, in the image forming apparatus according to the fourth embodiment, the density correction value can be calculated by using the patches with the pixel arrays before and after the skew correction formed with various dither lines and screen angles, for the density-correction-value determination patches, when the gradation processing method is the line-type dithering method. Thus, an appropriate density correction process can be performed, which allows prevention of degradation in image quality after the skew correction by satisfactorily reducing the stripe-like noises.

There are cases in which the stripe-like noises, being the density shift caused by the skew correction performed in the image process, sometimes look differently in a recorded image (on the print paper) depending on pixel density values of the image. Therefore, a fifth embodiment of the present invention explains a case of calculating a density correction value by using patches formed by changing a plurality of pixel density values, for the density-correction-value determination patches. A configuration of a color copier according to the fifth embodiment is the same as that of the first embodiment.

Figure 29:
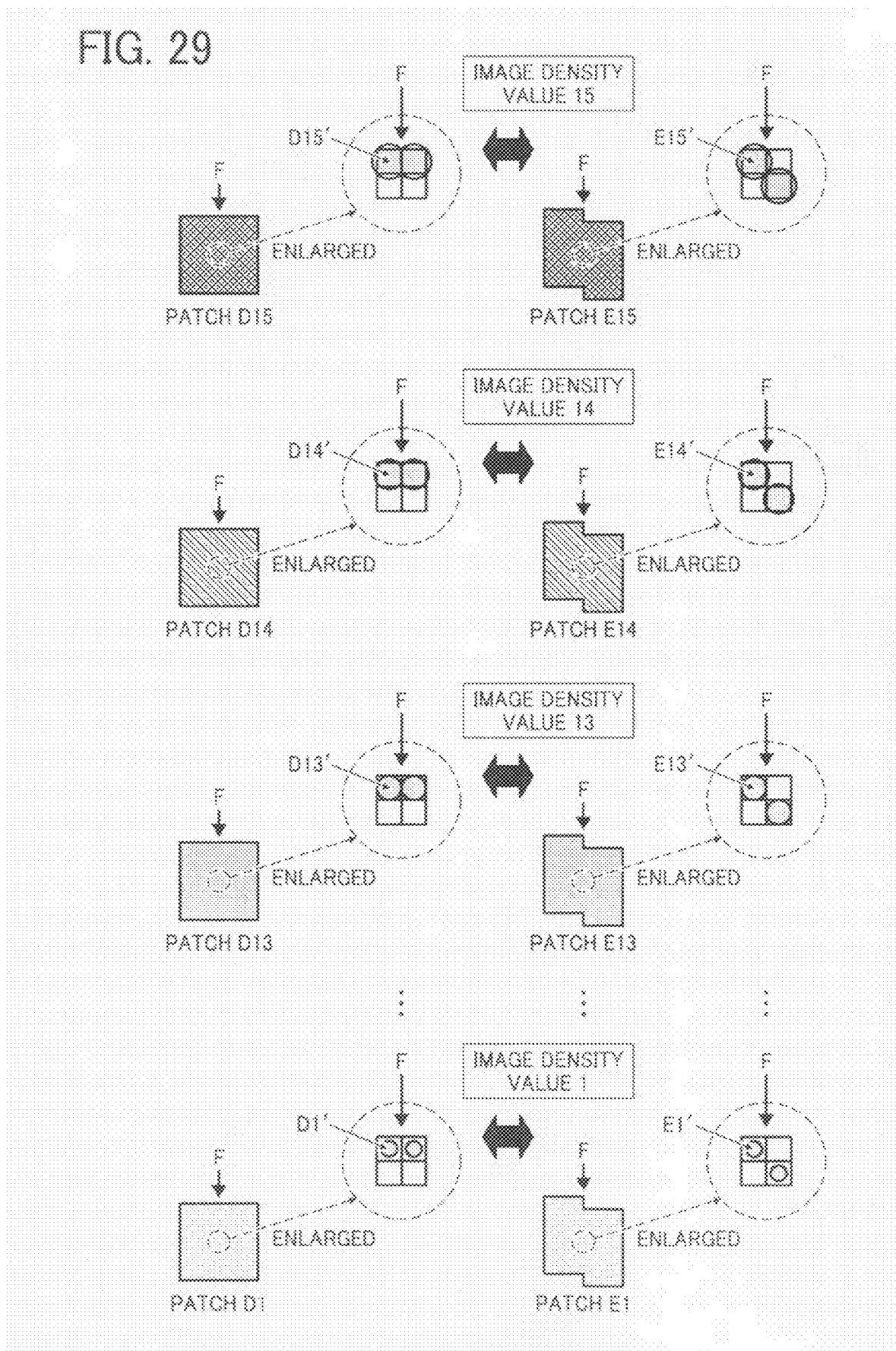
FIG. 29 is a schematic of density-correction-value determination patches in a case of expressing pixel density with 16-step gradation used in a fifth embodiment of the present invention.

FIG. 29 is a schematic of density-correction-value determination patches in a case of expressing pixel density with 16-step gradation (pixel density values 0 to 15) used in the fifth embodiment. Patterns of the density-correction-value determination patches in FIG. 29 are the same as the patch D and the patch E respectively explained with reference to FIG. 17 according to the first embodiment. However, the patch D has 15 types from D15 to D1 and the patch E has 15 types from E15 to E1 based on each difference between pixel densities. As explained in the first embodiment, the difference between pixel density values indicates a difference between drawing areas of pixels on an actual paper.

Here, the patches D15 and E15 have a highest density value such that the pixel density values of all the pixels therein are 15, the patches D14 and E14 have a second highest density value such that the pixel density values of all the pixels therein are 14, the patches D13 and E13 have a third highest density value such that the pixel density values of all the pixels therein are 13, and the patches D1 and E1 have a second lowest density value such that the pixel density values of all the pixels therein are 1. A patch such that the pixel density values of all the pixels are 0 (zero) or a patch with the lowest density value is a patch without any image. Therefore, this patch is actually unnecessary, and thus when the pixel density is expressed with 16-step gradation, a total of 15×2=30 types is required for the patch.

FIG. 29 shows only one pixel array on the boundary indicated by the arrow F in each enlarged portion of the patches for simplicity of explanation. The patch D15 is formed by repeating the same pixel array, and pixel arrays D15' are regularly arranged in rows. On the other hand, in the patch E15, although the pixel arrays D15' are regularly arranged in rows on the right side and the left side of the arrow F, the pixel arrays E15' are vertically arranged only in a portion along the arrow F. The patches D14 to D1 and the patches E14 to E1 have respectively same arrangement as explained above.

In the fifth embodiment, the density-correction-value determination patches composed of the patches D15 to D1 and the patches E15 to E1 are respectively transferred to the transfer belt 3, and the detection sensors 15 and 16 detect density values of all the density-correction-value determination patches. The CPU 122 calculates a density correction value X for each density-correction-value determination patch, and stores the calculated density correction values in the RAM 123. A calculation equation of the density correction value X is the same as Equation (4) explained in the first embodiment.

Here, let $XN_{15}$ be a density correction value when the pixel density value is 15, let $XN_{14}$ be a density correction value when the pixel density value is 14, let $XN_{13}$ be a density correction value when the pixel density value is 13, and let $XN_1$ be a density correction value when the pixel density value is 1, in the same way as above. It should be noted that when the pixel density value is 0, a density correction value $XN_0$ is set to 0 (zero). The density corrector 1353 performs the density-shift correction process by using any one of the density correction values $XN_{15}$ to $XN_0$ according to an instruction from the printer controller 111.

A density correction value is also calculated by arbitrarily combining the density-correction-value determination patches explained in the first to the fifth embodiments, and the density-shift correction process can be performed by using the calculated density correction value.

As explained above, in the image forming apparatus according to the fifth embodiment, a plurality of pixel density values are changed to form a patch for the density-correction-value determination patch, and a density correction value can be calculated by using the patch. Thus, an appropriate density correction process can be performed, which allows prevention of degradation in image quality after the skew correction by satisfactorily reducing the stripe-like noises.

In the fifth embodiment, the density correction value is previously calculated from a difference between the density value of a pixel array corresponding to that before the skew correction and the density value of a pixel array corresponding to that after the skew correction, and the density-shift correction process is performed by using a value obtained by adding or subtracting the calculated density correction value to or from the pixel density value of the target pixel before the skew correction, as a pixel density value of the target pixel after the skew correction. On the other hand, in a sixth embodiment according to the present invention, a pixel array after the skew correction being the density value the same as that of the pixel array corresponding to that before the skew correction is previously selected, a density correction value is calculated from the pixel density value of the selected pixel array, and the density-shift correction process is performed by using the density correction value as it is as the pixel density value after the skew correction. A configuration of a color copier according to the sixth embodiment is the same as that of the first embodiment.

Figure 30:
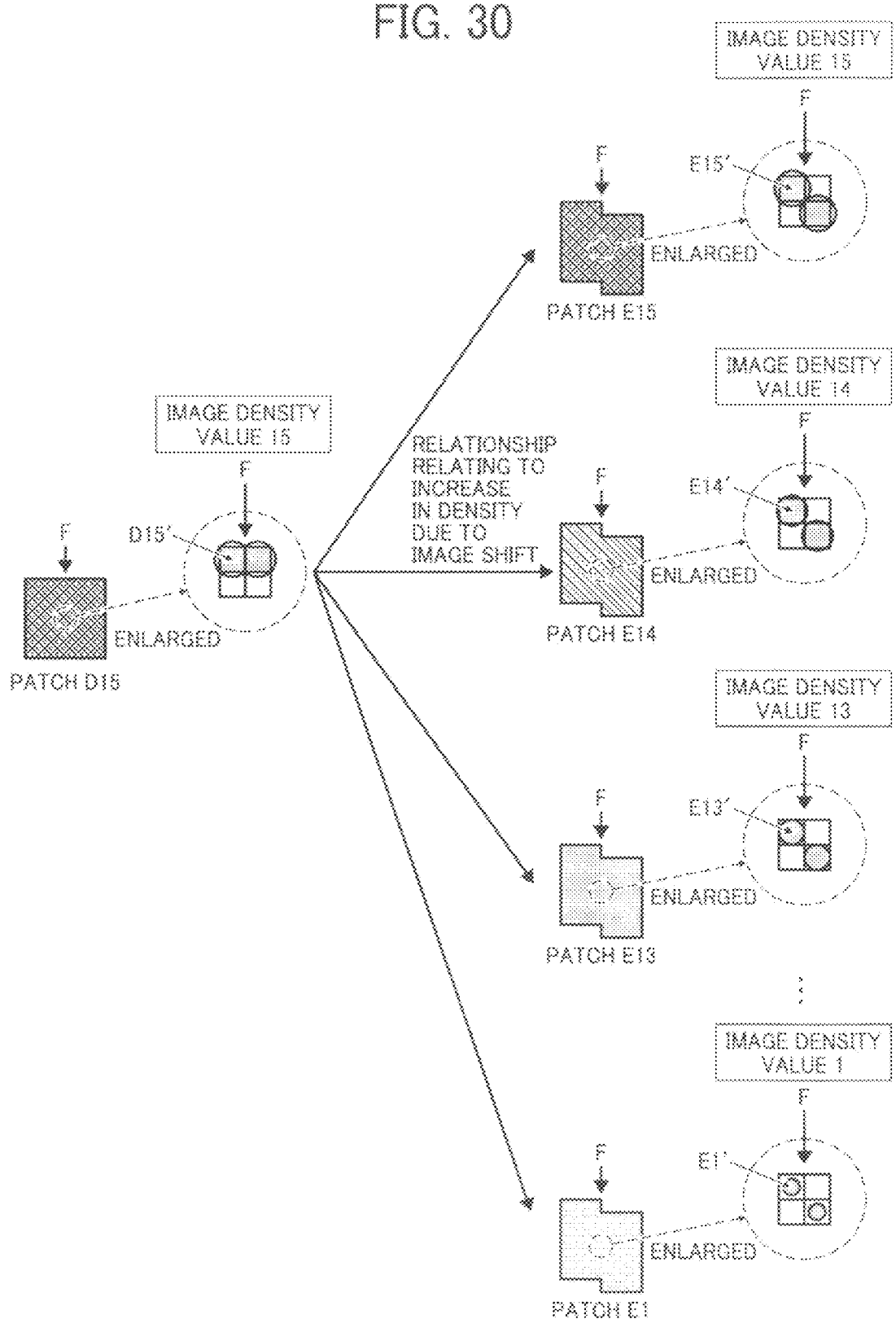
FIG. 30 is a schematic of an example of density-correction-value determination patches in a case of expressing pixel density with 16-step gradation (pixel density values 0 to 15) used in a sixth embodiment of the present invention.

FIG. 30 is a schematic of an example of density-correction-value determination patches in a case of expressing pixel density with 16-step gradation (pixel density values 0 to 15) used in the sixth embodiment. In the patch D15 on the left side in FIG. 30 (the same as the patch D15 explained in the fifth embodiment), pixel arrays before the skew correction (before an adjacency relationship between pixels at the shift position is changed) are regularly arranged in rows. More specifically, each of the pixel arrays is composed of pixels with a pixel density value 15 on which the skew correction is to be performed. This example is the same as the pixel array composed of the pixel A and the pixel B before the shift in FIG. 13A explained in the first embodiment. In the patches E15 to E1 on the right side in FIG. 30 (the same as the patches E15 to E1 explained in the fifth embodiment), pixel arrays composed of pixels with pixel density values 0 to 15 after the skew correction (after an adjacency relationship between pixels at the shift position is changed) are regularly arranged. This example is the same as the pixel array composed of the pixel A and the pixel B after the shift in FIG. 13A explained in the first embodiment.

The density-correction-value determination patches composed of the patch D15 and of the patches E15 to E1 as shown in FIG. 30 are respectively transferred to the transfer belt 3, and the detection sensors 15 and 16 detect density values of all the density-correction-value determination patches. The CPU 122 selects a patch with the same density as that of the patch D15 from the patches E15 to E1, calculates a density correction value W from the density value of the patch, and stores the calculated density correction value W in the RAM 123. The density correction value W is determined from the following Equation (5).

$$W = (\alpha/\beta) \times (|XEx|) \qquad (5)$$

Where $\alpha$ is the number of gradations expressing one pixel (dot), and therefore, when 16 steps of 0 to 15 are used to express the one pixel, $\alpha=16$. Furthermore, $\beta$ is a resolution of the detection sensor for density, XEx is a density value of the patch Ex detected by the detection sensors 15 and 16, and, in this case, is a density value of the patch E (15 to 0) which is the same density value as that of the patch D15.

In this example, when the increase in density is detected, the density corrector 1353 sets the pixel density value of the target pixel after the skew correction to W when the pixel density value of the target pixel before the skew correction is 15. That is, in the sixth embodiment, a calculated density correction value W is set as it is as the pixel density value after the skew correction.

Practically, all the patches D15 to D1 and patches E15 to E1 are transferred to the transfer belt 3, and the detection sensors 15 and 16 detect density values of all the density-correction-value determination patches. Density correction values W are calculated in all the relationships each between densities (pixel density values 0 to 15) before the shift and densities (pixel density values 0 to 15) after the shift when the density is increased due to image shift and in all the relationships each between densities (pixel density values 0 to 15) before the shift and densities (pixel density values 0 to 15) after the shift when the density is decreased due to image shift. The density corrector 1353 performs the density-shift correction process by using any one of the density correction values W according to an instruction from the printer controller 111.

As explained above, in the image forming apparatus according to the sixth embodiment, it is possible to select a pixel array after the skew correction which is a density value the same as that of the pixel array corresponding to that before the skew correction and to calculate a density correction value from the pixel density value of the selected pixel array. Therefore, the density correction value can be used as the pixel density value after the skew correction to perform the density-shift correction process, thus preventing degradation in image quality after the skew correction by satisfactorily reducing the stripe-like noises.

According to one aspect of the present invention, it is possible to prevent degradation in image quality after the skew correction by sufficiently reducing the stripe-like noises.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that divides pixels expressing one line of image in a main-scanning direction, outputs divided pixels by shifting the pixels in a sub-scanning direction opposite to a skew to thereby correct the skew, and performs a density correction process on a target pixel adjacent to a shift position or a nearby pixel of the target pixel to correct a density variation due to a shift of the pixel upon correction of the skew, the image forming apparatus comprising:
   a density detector that detects a first density of a first pattern formed by repeating a specific pixel array and a second density of a second pattern in which a repetition of the specific pixel array is shifted by one pixel with a boundary from a density-correction determination patch that is composed of the first pattern and the second pattern and transferred to a transfer belt;
   a density-correction-value calculator that calculates a density correction value from the first density and the second density;
   a noise-occurrence determination unit that determines whether the target pixel is a noise generating pixel that causes a change of a local density due to a change in an adjacency relationship between the target pixel and the nearby pixel; and
   a density correction processor that performs the density correction process on the target pixel, when the target pixel is determined as the noise generating pixel, by adding or subtracting the density correction value to or from the target pixel or the nearby pixel.

2. The image forming apparatus according to claim 1, wherein the density-correction-value calculator calculates the density correction value from a difference between the first density and the second density.

3. The image forming apparatus according to claim 1, wherein the specific pixel array is a pixel array in which two pixels are adjacently arranged.

4. The image forming apparatus according to claim 3, wherein the specific pixel array is a pixel array in which at least one pixel is arranged adjacently to each of adjacent two pixels.

5. The image forming apparatus according to claim 1, wherein the specific pixel array is a pattern used for a gradation process of an image.

6. The image forming apparatus according to claim 5, wherein the specific pixel array is a pattern used for a dot-concentrated-type dithering process as the gradation process.

7. The image forming apparatus according to claim 5, wherein the specific pixel array is a pattern used for a line-type dithering process as the gradation process.

8. The image forming apparatus according to claim 1, wherein when the density-correction-value determination patch is provided in plural, the specific pixel array is differently provided for each density-correction-value determination patch.

9. The image forming apparatus according to claim 1, wherein when the density-correction-value determination patch is provided in plural, a density of a pixel in the specific pixel array is different for each density-correction-value determination patch.

10. The image forming apparatus according to claim 1, wherein
    the density-correction-value determination patch is provided in plural in each of which densities of pixels in the specific pixel array are different from each other, and
    the density-correction-value calculator calculates the density correction value from a density value of the second pattern that has a density same as that of the first pattern.

11. A method of correcting a density shift in an image forming apparatus that divides pixels expressing one line of image in a main-scanning direction, outputs divided pixels by shifting the pixels in a sub-scanning direction opposite to a skew to thereby correct the skew, and performs a density correction process on a target pixel adjacent to a shift position or a nearby pixel of the target pixel to correct a density variation due to a shift of the pixel upon correction of the skew, the method comprising:
    detecting a first density of a first pattern formed by repeating a specific pixel array and a second density of a second pattern in which a repetition of the specific pixel array is shifted by one pixel with a boundary from a density-correction determination patch that is composed of the first pattern and the second pattern and transferred to a transfer belt;
    calculating a density correction value from the first density and the second density;
    determining whether the target pixel is a noise generating pixel that causes a change of a local density due to a change in an adjacency relationship between the target pixel and the nearby pixel; and performing the density correction process on the target pixel, when the target pixel is determined as the noise generating pixel, by adding or subtracting the density correction value to or from the target pixel or the nearby pixel.

12. A computer program product comprising a non-transitory computer-usable medium having computer-readable program codes embodied in the medium for correcting a density shift in an image forming apparatus that divides pixels expressing one line of image in a main-scanning direction, outputs divided pixels by shifting the pixels in a sub-scanning direction opposite to a skew to thereby correct the skew, and performs a density correction process on a target pixel adjacent to a shift position or a nearby pixel of the target pixel to correct a density variation due to a shift of the pixel upon correction of the skew, the program codes when executed causing a computer to execute:

detecting a first density of a first pattern formed by repeating a specific pixel array and a second density of a second pattern in which a repetition of the specific pixel array is shifted by one pixel with a boundary from a density-correction determination patch that is composed of the first pattern and the second pattern and transferred to a transfer belt;

calculating a density correction value from the first density and the second density;

determining whether the target pixel is a noise generating pixel that causes a change of a local density due to a change in an adjacency relationship between the target pixel and the nearby pixel; and performing the density correction process on the target pixel, when the target pixel is determined as the noise generating pixel, by adding or subtracting the density correction value to or from the target pixel or the nearby pixel.

* * * * *